US007016934B2

(12) United States Patent
Kawamura et al.

(10) Patent No.: US 7,016,934 B2
(45) Date of Patent: *Mar. 21, 2006

(54) COOPERATE PROCESSING UNITS USING STORED COOPERATION PROBLEM SOLVING KNOWLEDGE AND RECEIVE INFORMATION TO PERFORM PROBLEM SOLVING

(75) Inventors: Takahiro Kawamura, Ohta-ku (JP); Yasuyuki Tahara, Yokohama (JP); Naoki Kase, Yokohama (JP); Tetsuo Hasegawa, Shibuya-ku (JP); Akihiko Ohsuga, Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 508 days.

This patent is subject to a terminal disclaimer.

(21) Appl. No.: 10/340,619

(22) Filed: Jan. 13, 2003

(65) Prior Publication Data
US 2003/0144975 A1 Jul. 31, 2003

Related U.S. Application Data

(63) Continuation of application No. 09/305,753, filed on May 6, 1999, now Pat. No. 6,529,934.

(30) Foreign Application Priority Data

| May 6, 1998 | (JP) | ................................ 10-123382 |
| Sep. 30, 1998 | (JP) | ................................ 10-278527 |

(51) Int. Cl.
*G06F 15/16* (2006.01)
(52) U.S. Cl. .................. 709/202; 718/100; 718/102
(58) Field of Classification Search ............... 718/100, 718/102; 709/202
See application file for complete search history.

(56) References Cited

U.S. PATENT DOCUMENTS 5,872,972 A 2/1999 Boland et al.

(Continued)

FOREIGN PATENT DOCUMENTS

JP 05-238455 9/1993

(Continued)

OTHER PUBLICATIONS

"The DARPA Knowledge Sharing Effort : Progress Report" by Ÿbibitem{DARPA} Paaatil, P.S., Fikes, R.E., Patel-Schneider, R.E., Macay, D., Finin, T., Gruber, T.R. and Neches, R., Proceedings of the Third International Conference on Principles of Knowledge Representation and Reasoning, 1992.

(Continued)

*Primary Examiner*—Meng-Al T. An
*Assistant Examiner*—Lilian Vo
(74) *Attorney, Agent, or Firm*—Banner & Witcoff, Ltd.

(57) ABSTRACT

A mobile agent mediates cooperation among schedulers by executing a cooperation protocol. For heuristics such as strategies and the order in which variables are decided, which are used as criteria of selecting the value of a variable from candidates, when the heuristics are to be built into a solving method of a constraint satisfaction problem, processes with regard to these heuristics are so substantially localized as to be capable of parallel execution. These processes capable of parallel execution, as autonomous operations of different mobile agents, can be under modeling in natural form, resulting in easy installation. This facilitates software construction for reflecting the heuristics in a solving method of a constraint satisfaction problem, as well as improves the maintainability and extendibility of software.

16 Claims, 22 Drawing Sheets

U.S. PATENT DOCUMENTS

| | | | |
|---|---|---|---|
| 5,944,783 | A | 8/1999 | Nieten |
| 6,012,152 | A | 1/2000 | Douik et al. |
| 6,065,039 | A | 5/2000 | Paciorek |
| 6,092,099 | A | 7/2000 | Irie et al. |
| 6,134,580 | A | 10/2000 | Tahara et al. |
| 6,148,327 | A | 11/2000 | Whitebread et al. |
| 6,226,666 | B1 | 5/2001 | Chang et al. |

FOREIGN PATENT DOCUMENTS

| | | |
|---|---|---|
| JP | 07-242940 | 9/1995 |

OTHER PUBLICATIONS

"Mobile Agent Technology Implementing Network Society" by Shiniti Motoida, Takashi Moriyasu, Takahiro Kawamura, Toshiba review, vol. 53, No. 8, pp. 2-6, Aug. 1998.

"JAFMAS : A JAVA-based Agent Framework for Multiagent Systems Development and Implementation" by Chauhan, D., phD thesis, ECECS Department, University of Cincinnati, 1997.

Sycara, K.P, Sadeh, N. and Fox, M.S., "Distributed constrained heuristics search", IEEE Transactions on Systems, Man And Cybernetics, vol. 21, No. 6, pp. 1446-1461, 1991.

Sycara, K.P, Roth, S.F., Sadeh, N. and Fox, M.S., "Resource Allocation in Distributed Factory Scheduling", IEEE Expert, vol. 6, No. 1, pp. 29-40, 1991.

Barbuceanu, M. and Fox, M.S., "Cool : A language for describing coordination in multi agent systems," Proceedings of the First International Conference on Multi-Agent Systems, pp. 17-24, 1995.

Genesereth, M., et al., "Software Agents," Special issue on Intelligent Agents, Communication of the ACM, vol. 37, No. 7, pp. 48-53, Jul. 1994.

"Knowledge Sharing and Reuse by Cooperative Architecture," Nishida, Toyoaki, Jan. 1994.

Shinichi Honiden, "Mobile Agents Technology—Software Technology for Network Computing," Sep. 15, 1998, pp. 228-233 (English Abstract only).

Takahiro Kawamura et al., "An Approach to Distributed Constraint Satisfaction Problems by Using Mobile Agents—Development of Distributed Cooperative Power Outage Scheduling System," IEICE Technical Report, vol. 98, No. 58, May 21, 1998, pp. 15-22 (English Abstract only).

FIG. 12
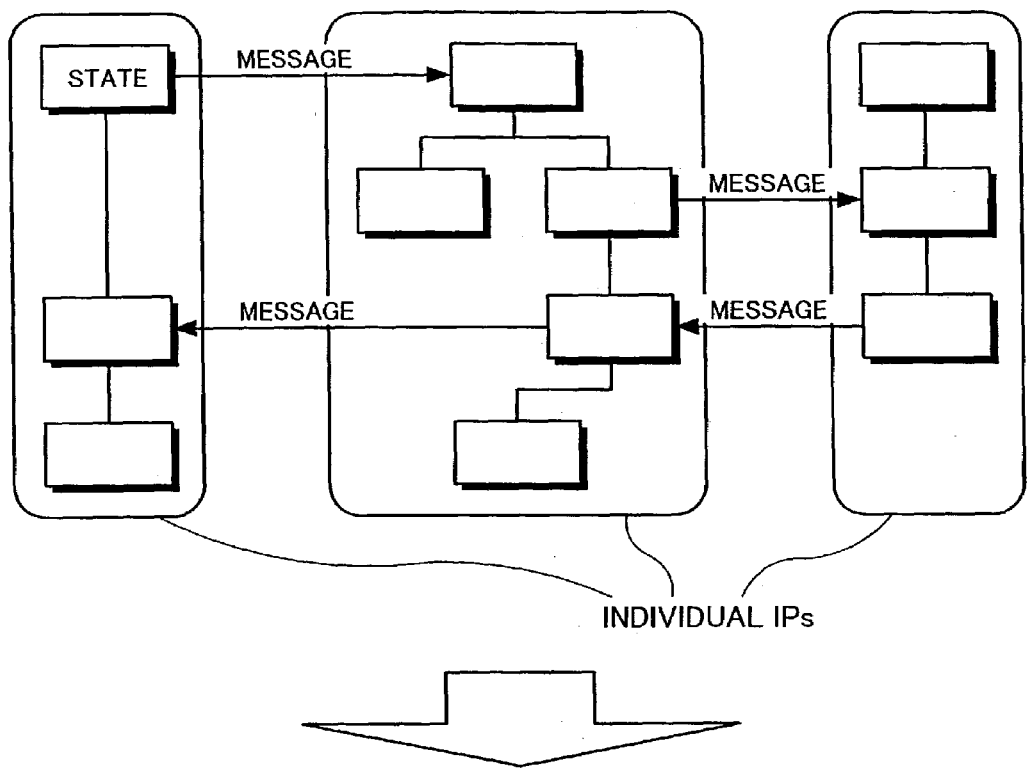
INDIVIDUAL IPs
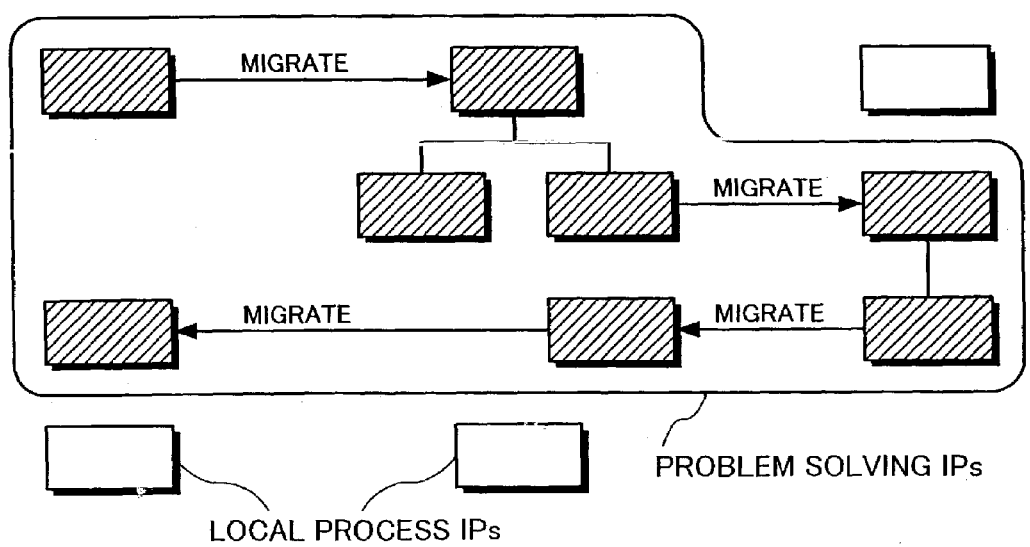
LOCAL PROCESS IPs
PROBLEM SOLVING IPs

FIG.13

```
<?xml version ="1.0"?>
<!DOCTYPE request SYSTEM "request.dtd">
<request>
    <sender>Mediation Agent A</sender>
    <receiver>Agent Wrapper for DB</receiver>
    <content>
        <action>get</action>
        <parameter>aluminum</parameter></content>
    <protocol>contract net</protocol>
    <reply-with>order7</replay-with>
    <language>environment</language>
</request>

<?xml version="1.0"?>
<!DOCTYPE inform SYSTEM "inform.dtd">
<inform>
    <sender>Agent Wrapper for DB</sender>
    <receiver>Mediation Agent A</receiver>
    <content>
        <action>Done</action>
        <parameter>1023.7 mg</parameter></content>
    <protocol>none</protocol>
    <in-reply-to>order7</in-reply-to>
    <language>environment</language>
</inform>
```

COOPERATE PROCESSING UNITS USING STORED COOPERATION PROBLEM SOLVING KNOWLEDGE AND RECEIVE INFORMATION TO PERFORM PROBLEM SOLVING

CROSS REFERENCE TO RELATED APPLICATIONS

This application is a continuation of prior U.S. application Ser. No. 09/305,753, filed May 6, 1999, now U.S. Pat. No. 6,529,934, which is based upon and claims the benefit of priority from the prior Japanese Patent Application Nos. 10-123382, filed May 6, 1998 and 10-278527, filed Sep. 30, 1998, the entire contents of which are incorporated herein by reference.

BACKGROUND OF THE INVENTION

1. Field of the Invention

The present invention relates to an improved technique for processing information using a computer network, and more particularly to an improved technique for distributed processing with regard to constraint satisfaction problem and an improvement in technology for readily realizing flexible bonding of a plurality of the existing systems.

2. Description of the Related Art

Recently, a practical approach using the framework of a constraint satisfaction problem (CSP) has been made to various problems including production scheduling problems and facilities and parts layout problems. The constraint satisfaction problem refers to a problem of finding a combination of values satisfying a constraint for a plurality of variables.

In a constraint satisfaction problem, individual elements such as facilities or parts constituting an actual problem are represented by variables. In this case, there are many constraints that may include one requiring that the facilities and the parts be placed at least a predetermined distance apart between each two of them. These constraints are represented as constraints among variables. An actual thing, such as which one of several alternatives is to used or where in a plane or on a time-axis each element is to be placed, is represented by a specific value of each variable. After that, finding the values of the individual variables that satisfy the above-described constraint gives a solution of the problem.

That is, to fund a solution is to find a combination of variable values that satisfy the constraint. A combination of such variable values represents, for instance, a working schedule or a semiconductor device layout. A part of a solution, for example, a combination of some of the variables, is called a partial solution. The processing of such a constraint satisfaction problem is based on the branch search that performs a search, for example, when there are several branches that are capable of acquiring several alternative variable values, with regard to what kind of alternatives exist as the next branches according to which one is selected from the current several branches.

Knowledge about problem solving, such as a processing procedure for solving a constraint satisfaction problem, is called problem solving knowledge. Knowledge about the elements, or variables, of a target, such as a schedule or a layout, to be solved as a constraint satisfaction problem and about a constraint among the elements or variables is called target knowledge.

One known solving method for this constraint satisfaction problem is a method in which a single problem solver provides knowledge about the problem and, at the same time, dissolves all the constraints. 'Ib "dissolve" a constraint is to assign specific values not conflicting with the constraint. FIG. 22 is a diagram showing the concept of a single problem solver which has both problem solving knowledge and target knowledge. The problem solver calls a method corresponding to individual target knowledge for problem solving.

However, for a large constraint satisfaction problem such as an actual scheduling problem, a target for which problem solving is performed is physically distributed and, in most cases, the decision making actions at several levels are performed concurrently. In addition, assigning all tasks to the single problem solver requires the unified management of a large amount of data and results in the disclosure of information associated with the local aspect of the problem at one particular point, thus making it difficult to ensure security.

In particular, it is difficult to apply the single, centralized system described above to an actual large problem. The constraint satisfaction problem is, for example, a power cut plan for work of electric power system facilities. The power cut plan for work of electric power system facilities sets up dates on which power transmission will be temporarily suspended to maintain, replace, or add various types of facilities (bus bar, power transmission line, power generator, transformer, etc.).

Most conventional systems for supporting the power cut plan for work of electric power system facilities collect the schedules of all stations in one location (Reference: "Development of Support System of Power Cut Plan for World" by Akitomo Otubo, Toshio Takahasi, Datashi Saito, Kazue Simada, Masaya Ono, Hirotaka Nakano, Yosiaki Osako, pp. 138–139, 1997 Power System Convention, 1997). However, the system according to the prior art such as described above must perform a huge amount of centralized calculation and therefore requires a long processing time because the scale is very large. In addition, when the result of centralized calculation is not accepted by stations, the centralized calculation must be repeated. This sometimes causes a communication bottleneck.

Another problem is that the centralization of processing or communication loads decreases the applicability to the dynamic environment in the real world. For this reason, a method for modeling an actual large constraint satisfaction problem and for solving the problem efficiently with a plurality of solvers in the distributed coordination mode is now being studied.

This problem solving method, which works in the distributed coordination mode through a plurality of problem solvers, allows individual stations in the electric power system to work together to solve constraints coordinatable locally among themselves, except when the constraints require system-wide information as in a current calculation. This method gives us many advantages; that is, it reduces the centralized calculation load, reduces the coordination time, and results in fewer modification requests from the schedule made by each station.

Recently, many actual problems are modeled as large constraint satisfaction problems. And, as the means for solving such modeled problems efficiently, more emphasis is placed now on the constraint satisfaction problem solving method which works in the distributed coordination mode described above.

The method for satisfying constraints in the distributed coordination mode is called a distributed constraint satisfaction or a distributed constraint satisfaction problem. The method sometimes uses a plurality of equal agents (problem solvers). Standard algorithms used for this method include the synchronous backtrack algorithm and the asynchronous backtrack algorithm (Reference: "Tutorial Distributed Search and Its Surroundings" by Makoto Yokoo, Computer Software Vol. 12, No. 1, pp. 31–86, January 1995/"New Development of CSP: Distributed/Dynamic/Incomplete CSP" by Makoto Tokoo, Katsutosi Hirayama, Artificial Intelligence, Vol. 12, No. 3., pp. 381–389, May. 1997).

The synchronous backtrack algorithm executes the backtrack type search algorithm using a plurality of agents. In this algorithm, the order in which agents determine their variables is fixed. More specifically, the first agent temporarily determines the values of its own variables and sends the values (partial solution) to the next agent. The next agent determines the values of its own variables so that the values satisfy both the partial solution and the constraint and adds the values to the partial solution; it then sends the resulting partial solution to the next agent.

When some agent tries to determine the values of its own variables but finds that there is no value satisfying the partial solution and the constraint, the agent sends a value-change request (backtrack) message to the previous agent.

In this synchronous backtrack algorithm, agents send the partial solution serially, allowing the knowledge owned by individual agents to be integrated and thereby giving a solution satisfying the constraints.

Sycara and his group proposed the back jumping algorithm developed by improving the search efficiency of the above-described backtrack algorithm. They are studying the application of that algorithm to the scheduling problem. (Reference: Sycara, K. P, Sadeh, N. and Fox, M. S., "Distributed constrained heuristics search", IEEE Transactions on Systems, Man And Cybernetics, Vol. 21, No.6, pp. 1446–1461, 1991. Sycara, K. P, Roth, S. F., Sadeh, N. and Fox, M. S., "Resource Allocation in Distributed Factory Scheduling", IEEE Expert, Vol. 6, No.1, pp. 29–40, 1991).

Unlike the backtrack algorithm described above, the asynchronous backtrack algorithm allows the agents to determine their own values asynchronously and concurrently based on the local information. And, the agents exchange the new constraint (nognod) with each other to find a combination of variable values satisfying the system-wide constraints.

The distributed constraint satisfaction technology like this include CORBA (Common Object Request Broker Architecture), an ORB (Object Request Broker) proposed by OMG (Object Management Group). The ORB is a mechanism responsible for execution, communication, and management of functionally-divided applications, each composed of objects, in a distributed system. This architecture not only provides the applications with the basic operation of the objects but also allows the applications to use sophisticated common and generic functions, such as printing and data exchange. It also provides business applications with the services common to all applications as well as the services specific to each application.

FIG. 23 is a diagram showing the concept of the architecture like CORBA described above. As shown in the figure, each object has both problem solving knowledge and target knowledge. lb perform processing necessary for the target knowledge owned by an object, the object sends a message to some other object to use the method owned by that object.

Another distributed constraint satisfaction architecture is disclosed in Japanese Patent Laid-Open No. Hei 7-6157 and Japanese Patent Laid-Open No. Hei 9-91431. In this architecture, the agents resident in some nodes (called stationary agents) are used as schedulers each of which performs direct negotiation with other schedulers (hereinafter called "direct negotiation model").

FIG. 24 is a diagram showing how a plurality of stationary agents SA perform direct negotiation with each other. Note that, in the direct negotiation model, agents, not the objects, are used and that they are autonomous. Therefore, as shown in the conceptual diagram in FIG. 25, each agent autonomously decides which method to use according to the condition under which the agent processes its own target knowledge.

Another method of sharing knowledge is also known, such as a facilitator model implemented through DARPA knowledge sharing activity (The DARPA Knowledge Sharing Effort). In this model, a plurality of agents use the coordination facilitator to exchange knowledge via the common language for exchanging common knowledge ("Knowledge Sharing and Reuse through Coordination Architecture" by Toyoaki Nishida, Artificial Intelligence Society Magazine, Vol. 9, No. 1, January 1994, pp. 23–28). That is, in the facilitator model, the agents exchange knowledge via one facilitator.

However, the prior art of distributed constraint satisfaction described above has the following problems. First, for an ORB such as CORBA and the direct negotiation model described above, the communication functions such as the highly-sophisticated message routing function or communication protocol must be included in advance. This makes it difficult to develop a distributed scheduling system and to utilize the existing scheduling system.

In addition, including these communication functions into individual schedulers results in the already-included protocol being always used as the scheduler coordination protocol, making it difficult to add or change the protocol. Thus, it is difficult to efficiently implement or use the constraint satisfaction algorithm, best suited for the constraint type, for use as the coordination protocol. The coordination protocol, a protocol defining a sequence of information exchange actions among a plurality of subjects to achieve an object, may be represented, in general, as a state transition diagram.

In addition, including complex processing, such as scheduler communication or branch search, into the individual schedulers constituting the direct negotiation model results in the frequent data exchange among schedulers especially when the variables of the schedulers must be coordinated step by step. This increases both the processing load of the individual schedulers and the communication amount over the network connecting the schedulers.

When a branch search fails due to a network error and the search of a part is terminated abnormally in the ORB or the direct negotiation model described above, the whole processing is influenced.

In the facilitator model described above, communication processing centralization in one facilitator causes a system bottleneck. In addition, the facilitator performs only simple message routing but does not virtually perform coordination processing. That is, the facilitator is not responsible for the progress of the whole processing, nor does it tell the individual schedulers what to do next.

Another problem with the constraint satisfaction method in the above-described distributed coordination mode is that heuristics is not reflected on the solution. Heuristics, also called an exploratory method, is thought of as a rule-of-thumb equation in which solutions are discovered by evaluation of the progress made toward the final result.

It is pointed out that, in general, solution search efficiency depends largely on the heuristics factors such as a strategy for the decision of individual agent variables or the variable decision priority order among agents (Reference: "Constraint Based Search and Its Application" by Kazuo Miyashita, Artificial Intelligence Magazine, Vol. 12, No. 3, pp. 374–380, May 1997). For a constraint satisfaction problem having a plurality of solutions, heuristics has a strong impact on the quality of the final solution.

Typical heuristics includes the ability to switch the strategy or the priority described above depending upon the situation. However, since the strategy and the priority are determined by the system configuration according to the conventional algorithm for distributed constraint satisfaction, heuristics cannot be reflected well on the processing and, as a result, it is difficult to increase the quality of search efficiency and quality.

Consider the power cut plan for work of electric power system facilities described above as an example. The coordination among stations is not fixed but varies according to the period of the year (busy season and off-season), the relation among stations, or the processing power of maintenance companies. And, the selection and the weighting of objects depend dynamically on such changeable factors as the priority of schedule coordination, min;mi~.~tion of movement during the work period, averaging of work load, and reduction in the number of suspensions.

Thus, coordination should be made more flexible depending upon the situation by using the coordination method or strategy In addition, it is expected that Japanese electric power companies will have power generation departments and power transmission departments in the near future like European and American power companies and that medium and small-sized electric generation companies will enter the electric power industry. If such is the case, it is desirable that a flexible coordination method be used, instead of the conventional fixed coordination method, to satisfy the need from the requesting stations and requesting departments directly and easily.

However, the method according to the prior art uses a fixed strategy and priority. Even if the strategy may be changed, the whole processing must be reexecuted each time the strategy is changed. Re-executing the whole processing for each strategy change requires a long time; in addition, it does not satisfy the need to find a solution more speedily.

Conventionally, even when there are a plurality of agents with equal priority, the method according to the prior art selects one of the agents sequentially. This method does not always give a solution satisfying individual agents and, therefore, there has been a need to increase the quality of a solution.

On the other hand, as computer networks have become popular rapidly, interconnection among applications over the network becomes more important.

In particular, in conjunction with the setup of the network infrastructure and the trend toward the openness of application software, the need arises to interconnect applications via the network. (Reference: "Software agents" by Genesereth, M. R. and Ketchpel, S. P, Special Issue on Intelligent Agents, Communications of the ACM, Vol. 37, No. 7, pp. 48–53, July. 1994/"Mobile Agent Technology Implementing Network Society" by Shiniti Motoida, Takashi Moriyasu, Takahiro Kawamura, Toshiba review, Vol. 53, No. 8, pp. 2–6, August 1998).

More specifically, it is desirable that the existing dedicated program, called the legacy system, and existing databases be used as much as possible and that, by working them together, efficient distributed systems be built and managed.

Representative applications include an experiment, called CALS (Commerce At Light Speed), which digitizes information relating to the whole life cycle of a product, EC (Electronic Commerce) such as online shopping, and inter enterprise EC aiming at the electronic commerce among enterprises. lb implement those applications, interconnection among applications over networks is a key to success.

Nowadays, a variety of technologies and standards are proposed to implement inter-system data exchange over networks. Some of the examples include SGML which is a document processing description system, XML which is a network version of SGML, and STEP which is used for representation and exchange of product technology data.

However, consistent operation of a distributed system requires knowledge sharing based on data exchange as well as the coordination among constituent elements that composes the distributed system. Lack of such a coordination function impairs the merit of the distributed system. However, in the conventional environment to develop such distributed system has never supported the coordination function sufficiently.

Recently, efforts have been made to develop a distributed object system using distributed system constituent elements as objects and a multi-agent system composed of a plurality of coordinating agents. However, most of development support tools for use on these systems have communication functions among constituent elements but not coordination functions among them. Therefore, a framework providing not only communication functions but also coordination functions is required. This framework is a partially completed software product used to create specific parts for use in building an actual distributed system.

That is, recently, the distributed architecture is shifting from the conventional client-server model (FIG. 26) to the distributed object model (FIG. 27) which may be built more flexibly. This type of distributed object model generally requires that the connected systems understand each other and that modeling and interface specifications be defined rigidly. For example, knowledge about the object (IDL interface and so on) of a remote partner must be known in advance. In addition, because the logic of coordination among a plurality of objects is not supported in the conventional object-oriented programming system, the object designer must include the logic into individual objects.

On the other hand, for the multi-agent model which is now under study, the constituent elements of a distributed system are regarded as agents. Several models are proposed for executing coordination among a plurality of agents.

Those models include KQML facilitators (Reference: "Actors: A model of Concurrent Computation in Distributed Systems" by Agha, G., The MIT Press, 1986/"An Overview of KQML: A knowledge Query and Manipulation Language" by Finin, T. and Wiederhold, G., Department of Computer Science, Stanford University, 1993./"The DARPA Knowledge Sharing Effort: Progress report" by Ÿbibitem{DARPA} Paaatil, P. S., Fikes, R. E., Patel-Schneider, R. E., Macay, D., Finin, T., Gruber, T. R. and Neches, R., Proceedings of the Third International Conference on Principles of Knowledge Representation and Reasoning, 1992.) and a model called a federation model.

However, these models place emphasis on speedy routing of each message in a system where connected agents interact with each other based on the exchange of KQML messages. This means that the models do not support the higher-level coordination function deciding how to solve the problem based on the messages received by a plurality of agent or issued from the user.

Agent development tools for the higher-level coordination function include COOL (Reference: "Cool: A language for describing coordination in multi agent systems" by Barbuceanu, M. and Fox, M. S., Proceedings of the First International Conference on Multi-Agent Systems, 1995.) and JAFMAS (Reference: "JAFMAS: A JAVA-based Agent Framework for Multiagent Systems Development and Implementation" by Chauhan, D., phD thesis, ECECS Department, University of Cincinnati, 1997).

These tools propose the general methodology for developing a multi-agent system based on Speech-Act (Reference: "How to do Things With Words" by Austin, J. L.(ed), Oxford University Press, 1962). At the same time, the tools support an interaction protocol (hereinafter called IP) for explicitly representing inter-dependency among KQML messages. This IP, primarily composed of the communication element and the coordination element, is a procedure allowing constituent elements, such as applications, to communicate with each other and to coordinate the constituent elements to solve a given problem.

However, creating the IP with the use of these tools is very complex. This is because each agent must have its own dedicated IP and that the IPs of all agents must be compatible. Therefore, when the user wants to add or modify some part of a problem solving procedure at initial time or during a production run, the complex interaction flow among agents must be broken down into the IP of each individual agents compatibly and repeatedly.

In particular, this task is impractical when there are many related agents or when the problem solving procedure is very complex. At the same tune, verifying whether or not the IPs of the agents are compatible becomes more difficult.

That is, the prior art attempted to achieve two objects at the same time: to process the difference in the interface formats which vary each constituent element just as dialects vary from district to district and to coordinate the interaction among individual constituent elements. This makes it difficult to develop the IP efficiently.

SUMMARY OF THE INVENTION

The present invention has been proposed in order to solving the problems of the related art described above. The first object of the present invention is to achieve an improved technique for distributed processing with regard to a constraint satisfaction problem. In other words, it is an object of the invention to cause an agent to mediate cooperation among a plurality of applications such as schedulers, thereby proceeding the whole processing smoothly, facilitating utilization of the existing applications and addition and change of cooperation protocols, avoiding concentration of processes and communications and reducing the range that is affected when a partial fault has occurred, and realizing flexible processing and improving search efficiency and quality of the solution.

The second object of the present invention is to provide a technique that can enhance flexible bonding of a plurality of the existing systems such as legacy systems and package software, by making use of a mediation agent.

The above-described problems in the prior art are solved by an improvement in information processing technology according to the present invention. In order to perform problem solving with regard to a given target, there are provided information processing systems and methods that mediate coordination among processing units by making use of at least one agent. In one aspect of the present invention, there is provided an information processing system comprising a plurality of processing units that form a distributed system and a means for generating at least one agent. Each processing unit has a first storage area storing target knowledge with regard to the target and problem solving knowledge representing how the problem solving is to be performed, and performs a part of the problem solving by making use of the target knowledge and the problem solving knowledge. Each generated agent has a second storage area storing cooperation problem solving knowledge that represents how the plurality of units cooperate with each other to perform the problem solving, and mediates cooperation among the units by making use of the cooperation problem solving knowledge to cause each unit to perform the problem solving.

According to this information processing system, by causing the agent to mediate cooperation among the plurality of processing units, an exchange among processing units and management of the whole processing are realized, resulting in that it is unnecessary to give a high degree of autonomy such as a complicated cooperation protocol for each processing unit. Therefore, a plurality of processing units such as existing schedulers that are used individually, can be used as bases to be combined with each other, resulting in easy construction of systems such as distributed and cooperative type of scheduling systems.

Since a cooperation protocol is encapsulated in an agent, it is easy to add and change protocols. Concretely, it is supposed that constraint satisfaction algorithms and the like, which are most suitable to dissolve various type of constraints, are installed as cooperation protocols, and selectively used according to purposes and situations.

By building various cooperation protocols into each of the mobile agents respectively, and selectively using them according to situations, it is possible to dynamically add a new cooperation function to the individual schedulers. This means that it is possible to hide a cooperation protocol among schedulers, facilitating the use of a new protocol without restriction by an existing protocol.

Further, in this information processing system, desirably, each processing unit performs a process for problem solving and, when it is necessary to cooperate with another processing unit, generates an agent to execute a cooperation protocol among said processing units. In this case, since the application generates an agent as the need arises to allow a desired protocol to be used, an improvement inflexibility of operation is achieved.

BRIEF DESCRIPTION OF THE DRAWINGS

FIG. 12 is a conceptual view that shows an example of with regard to IPs associated with problem solving procedure, how they are unified.

FIG. 13 is a explanatory drawing that illustrates exemplarily a form of message which is exchanged between a mediation agent and a wrapper.

DESCRIPTION OF THE PREFERRED EMBODIMENTS

Embodiments of the present invention are described below, with references made to relevant accompanying drawings. The present invention is generally implemented by a computer that has peripheral devices and software that controls the computer, in which case the software is a combination of instructions that follow the description of the present invention in this document, parts of the invention that are from the prior art making use of prior art methods that were described in the foregoing section on background art. This software is not limited to program code, and includes data that is prepared for use at the time the program code is executed.

The software implements the technique of the present invention by using physical resources which may include a processing unit such as a CPU, a coprocessor, or a chip set, an input device such as a keyboard or a mouse, a storage device such as a memory or a hard disk drive, and output devices such as a display or a printer.

It should be noted that various configurations of specific software and hardware can be used to implement the present invention. For example, the software can be in various forms, such as a compiler, an interpreter, or an assembler and, it is possible to perform communication externally by means of a removable storage medium such as a floppy disk, or a network connection unit. A storage medium such as a CD-ROM onto which is stored a program or software for implementing the present invention alone forms one aspect of the present invention. Additionally, part of the functions of the present invention can be implemented in a physical electronic circuit, such as an LSI device.

As described above, because there are various methods that can be envisioned for implementing this present invention using a computer, virtual circuit blocks that implement the individual functions of the present invention and the embodiments thereof will be used to describe the present invention and embodiments thereof below.

101. First Embodiment (1. Configuration)

(1-1. General Configuration)

Figure 1:
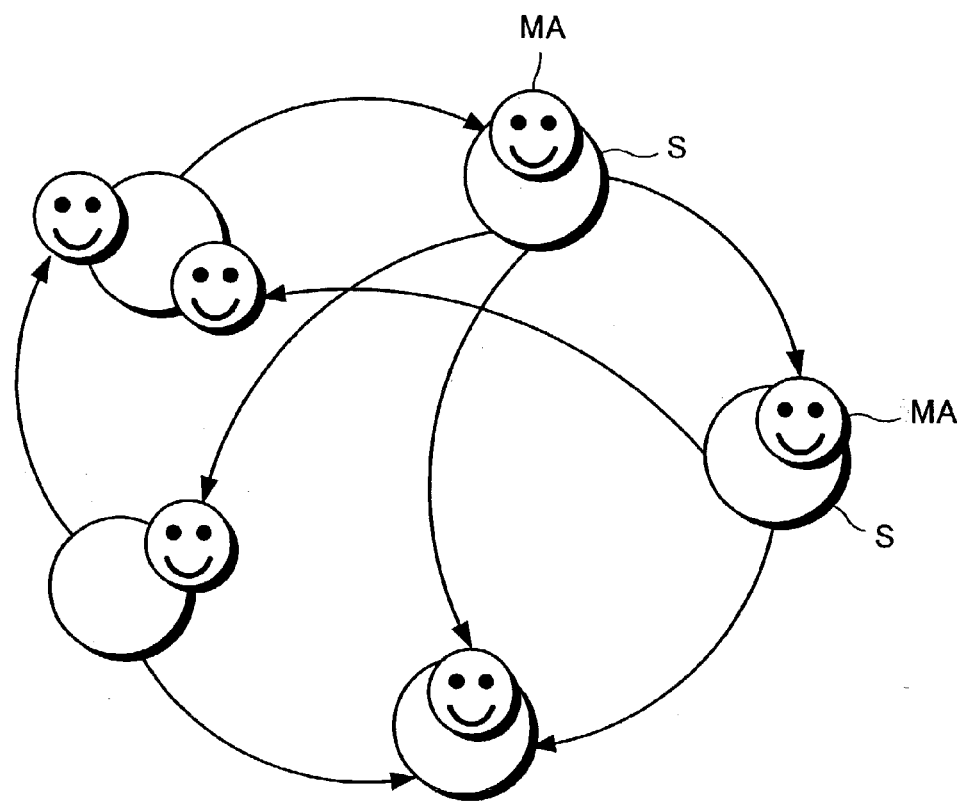
FIG. 1 is a conceptual view that shows the first embodiment of the present invention.

First, FIG. 1 is a conceptual view which shows a support system for planning of power cut for work of electric power system facilities, this support system providing support for the generation of a power cut plan for work of electric power system facilities, and this support system being an embodiment of distributed processing technology related to constraint satisfaction problem. Specifically, this embodiment has a plurality of schedulers S (corresponding to the above-noted applications) which correspond to various stations in the electric power system, and mobile agents MA, which mediate cooperation between the various schedulers.

In the above configuration, each of the schedulers S is formed by the addition of a wrapper for the purpose of connection to a mobile agent, added to an existing scheduling system that is used alone, and it is possible for the existing applications to be selected freely from package software and the like. In this embodiment the user, if required with respect to the individual schedulers, performs input of various scheduling data that is used in scheduling, such as the details of the facilities for each individual station in the electric power system.

In this embodiment, various facilities (such as main lines, transmission lines, generators, and transformers) that exist within the electrical power system, which is distributed among the various stations, serve as the "targets" as noted above, the above-noted "problem solving" being the generation of a power cut plan as a time schedule for suspending the transmission of power for the purpose of performing maintenance, replacement, and additions with regard to the facilities.

Figure 2:
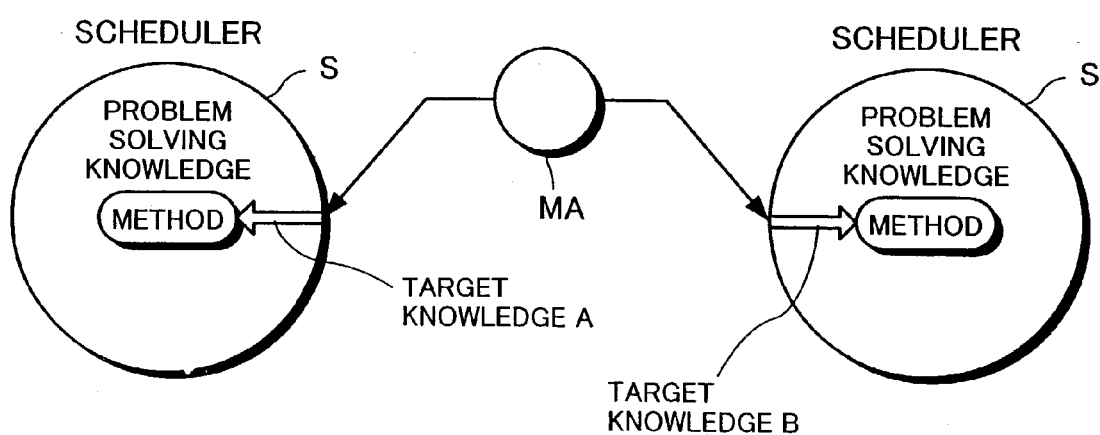
FIG. 2 is a conceptual view that shows a state of causing a mobile agent to mediate cooperation among schedulers S in the first embodiment of the present invention.

Further, in this embodiment, as shown in the conceptual view presented in FIG. 2, when any of the each of the schedulers S is required to cooperate by, for example, using target knowledge and methods held by another scheduler, it does not perform direct negotiation with or sending of a message to the other schedulers, but rather makes use of mediation of a mobile agent, the other scheduler S with which cooperation is to be performed, based on this mediation, responding by establishing, in accordance with the generation of its own power cut plan, what type of method is to be used, and what type of target knowledge is to have the values of its variables changed.

(1-2. Configuration of the Scheduler and the Mobile Agent)

The general configuration of the schedulers S that are connected to the computer network N and the mobile agents MA that migrate about the network N will be described below, with reference being made to FIG. 3. In this embodiment, if a scheduler S is required to cooperate with another scheduler S, a request such as a system call is output to software for implementing this embodiment, a mobile agent that performs mediation of cooperation being generated in response to this type of request.

Figure 3:
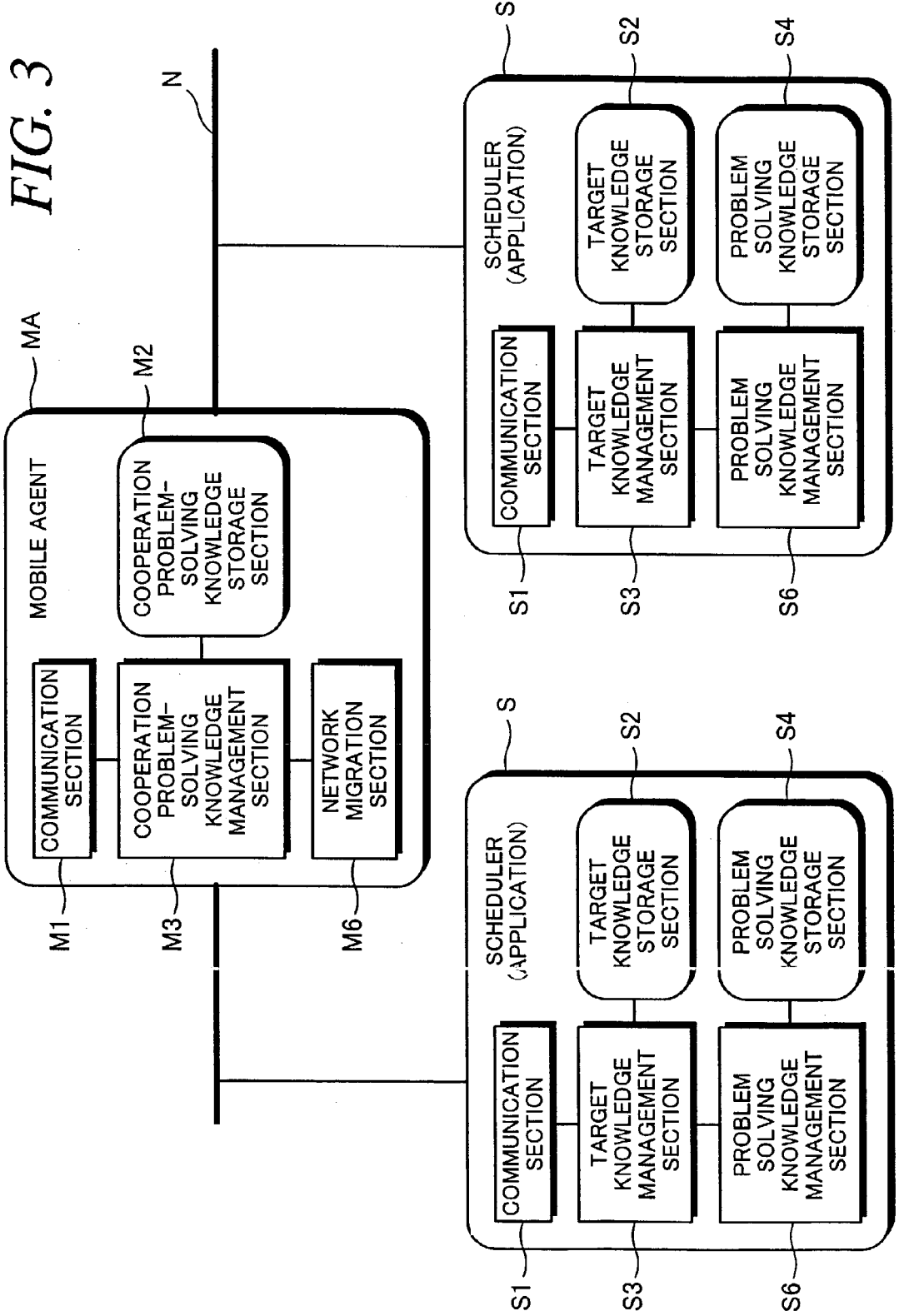
FIG. 3 is a functional block diagram that shows the configuration of the first configuration of the present invention.

Each of the schedulers S, as shown in FIG. 3, has a communication section S1 for the purpose of performing communication with a mobile agent via the network N, a target knowledge storage section S2, a target knowledge management section S3, a problem-solving knowledge storage section S4, and a problem solving knowledge management section S6.

Of the above elements of the scheduler S, the communication section S1 is a simple driver that has the minimal required configuration for making connection to a mobile agent MA that has migrated thereto and for performing data transfer with the mobile agent. The communication section SI has no particular complex message routing function or cooperation protocol for the purpose of transfer of messages with another scheduler. The target knowledge storage section S2 stores knowledge with regard to the configuration of electrical power system facilities, which are the target, this being the target knowledge. The target knowledge management section S3 performs access management of reading and updating with respect to the above-noted target knowledge.

The problem-solving knowledge storage section S4 stores problem-solving knowledge which represents what problem solving is to be done, this problem solving knowledge being chiefly processing procedures for the purpose of generating a partial power cut plan for individual stations. The problem-solving knowledge management section S6 manages access, for example, reading of the problem-solving knowledge which, in this case, also serves to perform processing for problem solving, that is, which also serves to use target knowledge and problem-solving knowledge to generate a partial power cut plan as described above.

The mobile agent MA serves to mediate cooperation between each application, by executing a cooperation protocol, this mobile agent MA having a communication section M1, a cooperation problem-solving knowledge storage section M2, a cooperation problem-solving knowledge management section M3,and a network migration section M6.

Of the above-noted elements, the communication section M1 communicates with each of the schedulers S. The cooperation problem-solving knowledge storage section M2 stores cooperation problem-solving knowledge that represents what kind of cooperation is to be performed in order to generate an overall electrical system power cut plan. The cooperation problem-solving knowledge management section M3 manages access, for example, reading of solving-solving knowledge described above which, in this case, also serves to mediate cooperation between a plurality of schedulers S, by executing a cooperation protocol in accordance with the problem-solving knowledge.

Figure 4:
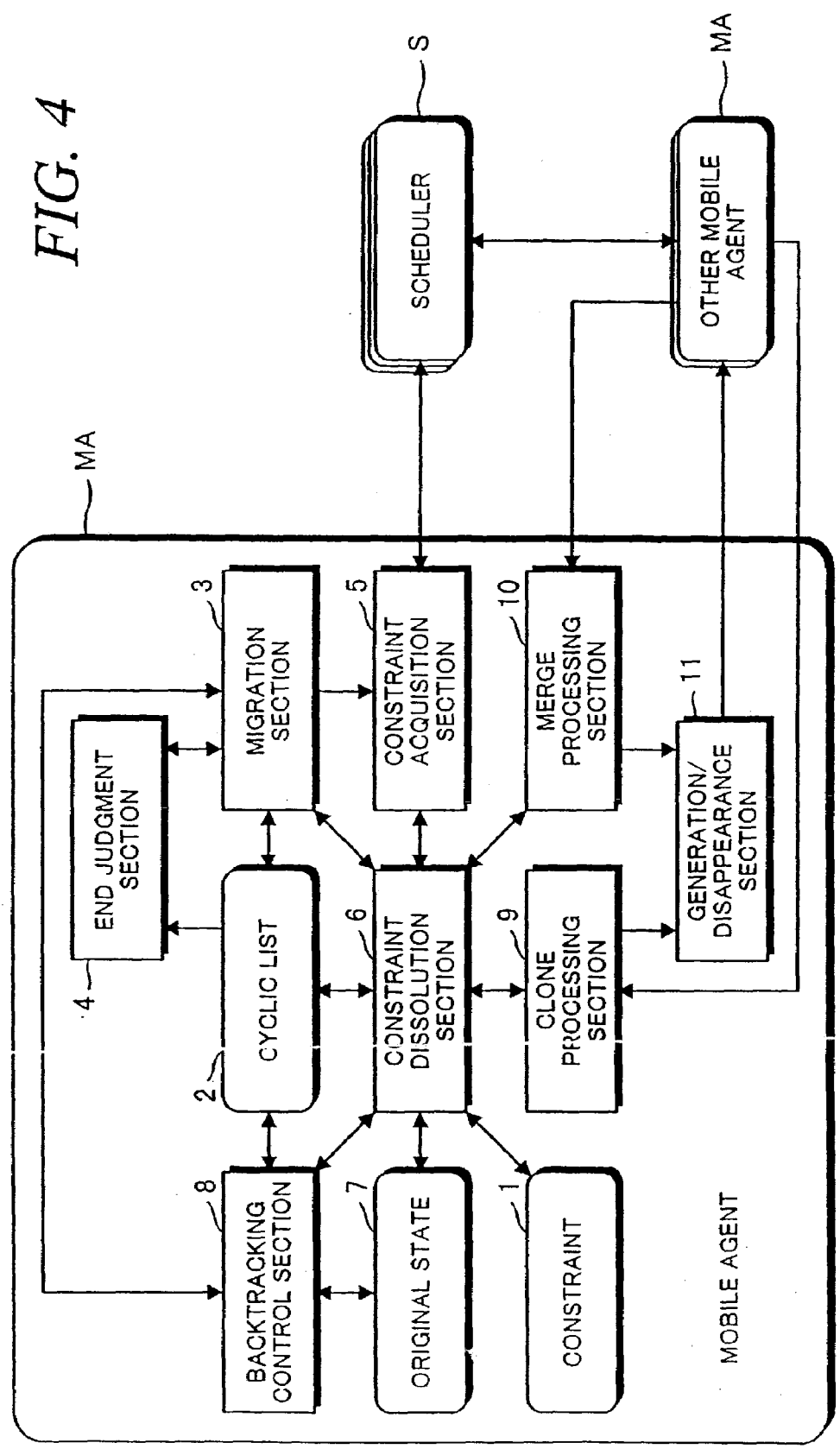
FIG. 4 is a functional block diagram that shows concretely the configuration of the mobile agent in the first configuration of the present invention.

That is, in a mobile agent MA, the above-noted cooperation problem solving knowledge storage section M2, cooperation problem-solving knowledge management section M3, and network migration section M6 implement a cooperation protocol, and in doing so cooperation is performed between schedulers. FIG. 4 shows a specific configuration of a mobile agent MA, viewed as a virtual circuit block for implementing this type of cooperation.

(1-3. Specific Mobile Agent Configuration)

A power cut plan for work of electric power system facilities, which is a constraint satisfaction problem in this embodiment of the present invention, is described below, with the premise that the configuration is that shown in FIG. 4. Specifically, the power cut plan for work of electric power system facilities describes what facilities at what station are to be suspended and during which periods, and is generated by assigning values to variables that represent, for example, the facilities or power cut periods, these values representing, for example, the facilities ID, and power cut dates and time. Each of the schedulers S that are in charge of the stations has a plurality of such variables, some of these variables being subject to constraints with respect to variables of other schedulers S, and some of these variables having no constraints with respect to variables of other schedulers S.

The generation of a power cut plan for work of electric power system facilities is directed to ultimate obtainment of the solution of the problem by the assignment of values to these variable that do not violate the constraints that are established between variables. For this reason, each of the schedulers S is minimally configured so as to assign values to variables that are not subject to constraints between variables of other schedulers S. With regard to variables that are subject to constraints with respect to the variables of other schedulers, if necessary, mobile agent MA mediation is done to assign values by performing cooperation so as to adjust the values of variables with respect to other schedulers.

In order to mediate such cooperation, a mobile agent MA has a migration section 3, an end judgement section 4, a constraint acquisition section 5, a constraint dissolution section 6, a backtracking control section 8, a clone processing section 9, a merge processing section 10, and a generation/disappearance section 11. Of these elements, the migration section 3 causes migration of a mobile agent MA on the network N as shown in FIG. 3, thereby causing cycling around the network N, and how a mobile agent MA is to be cycled around the network is stored as a cyclic list 2, this cyclic list 2 being updated in response to the progress situation of the cooperation protocol.

The end judgement section 4 makes a judgment about the end condition of the cooperation protocol. For example, in the case in which a mobile agent MA is generated by a request from a scheduler S and this mobile agent completes execution of the required cooperation protocol, this mobile agent independently disappears or is brought into disappearance by notification to the system from the scheduler S that issued the request.

The constraint acquisition section 5 receives a constraint that straddles a variable of a plurality of schedulers S or a variable of each individual schedulers S, a constraint 1 that is received in this manner being stored within the mobile agent MA.

The constraint dissolution section 6 generates a partial solution by assigning values to variables so that constraints are satisfied, after which it further assigns values to variables to extend the partial solution, in a manner that does not violate the partial solution that had been generated up until that point.

(1-4. Configuration Related to Backtracking Control)

In this manner, by the constraint dissolution section 6 assigning values sequentially to variables as the mobile agent cycles around the schedulers S, overall power cut plan for work of electric power system facilities approaches completion. Each time a partial solution is extended by assigning a new variable value, the immediately previous partial solution is stored within the mobile agent MA as the original state 7. The original state 7 can also, for example, be stored in a stationary agent.

In the case in which search space for a solution to a constraint satisfaction problem is of a tree structure, the new assignment of a value to a variable is equivalent to proceeding to the next branch in the tree. In correspondence with this, this original state 7 is stored in a stack, so that each time a variable value is stored, the old partial solution is pushed onto the stack, and when it is not possible to assign a value to a variable, the original state 7 is popped from the stack, this representing a return to the previous branch point in the tree, which represents a back-track.

That is, when there is a plurality of options for assigning a value to a variable, the backtracking control section 11 serves to generate a mobile agent that corresponds to each of the options. The judgment as to what type of agents MA 2 are to be generated in the case of what type of options, and in what cases what type of agent MA is to disappear and how it is to disappear, this representing the algorithm for a search of the solution, is performed by the done processing section 9 and the merge processing section 10.

(1-5. Clone Processing Section)

Specifically, when there are a plurality of values that can be assigned to a variable, so that there is a plurality of strategies for selecting values to be assigned to a variable in accordance with some criterion, the clone processing section 9 issues an instruction to the generation/disappearance section 11, so as to generate a mobile agent MA that corresponds to each of the strategies. In this case, each of the mobile agents MA that correspond to the strategies search for a solution by assigning values to variables in a mutually independent manner, in accordance with its strategy.

In this embodiment, when one solution is obtained of the mobile agents MA the clone processing section 9 and the sequence determining section 11, in response to the state, either bring each of the other mobile agents into disappearance corresponding to other strategies, or keep the series of mobile agents without disappearance until a solution is found by all mobile agents MA, these also serving to select the best of the mobile agents MA that correspond to each of the strategies, based on a pre-established criterion.

(1-6. Merge Processing Section)

The merge processing section 10, when there is a plurality of schedulers S that have approximately the same priority with regard to the sequence of establishing values, issues an instruction to the generation/disappearance section 11, thereby causing the generation of other mobile agents MA that correspond to each of the variables. In this case, each of the mobile agents that correspond to variables search for a solution by assigning values to its variable, in a mutually independent manner and in simultaneously in parallel fashion.

In this embodiment, when a series of mobile agents MA that correspond to a series of variables in this manner proceed to search for a solution that satisfies a pre-established criterion, the merge processing section 10 and the generation/disappearance section 11 serve also to change each of the variables so as to make the change in each of the variables minimum, while satisfying the constraints between these variables, thereby integrating these variables into a single mobile agent MA, that is, merging these variables.

(2. Action)

Next, the action of the first embodiment, configured as described above, will be described.

(2-1. General Action)

Figure 5:
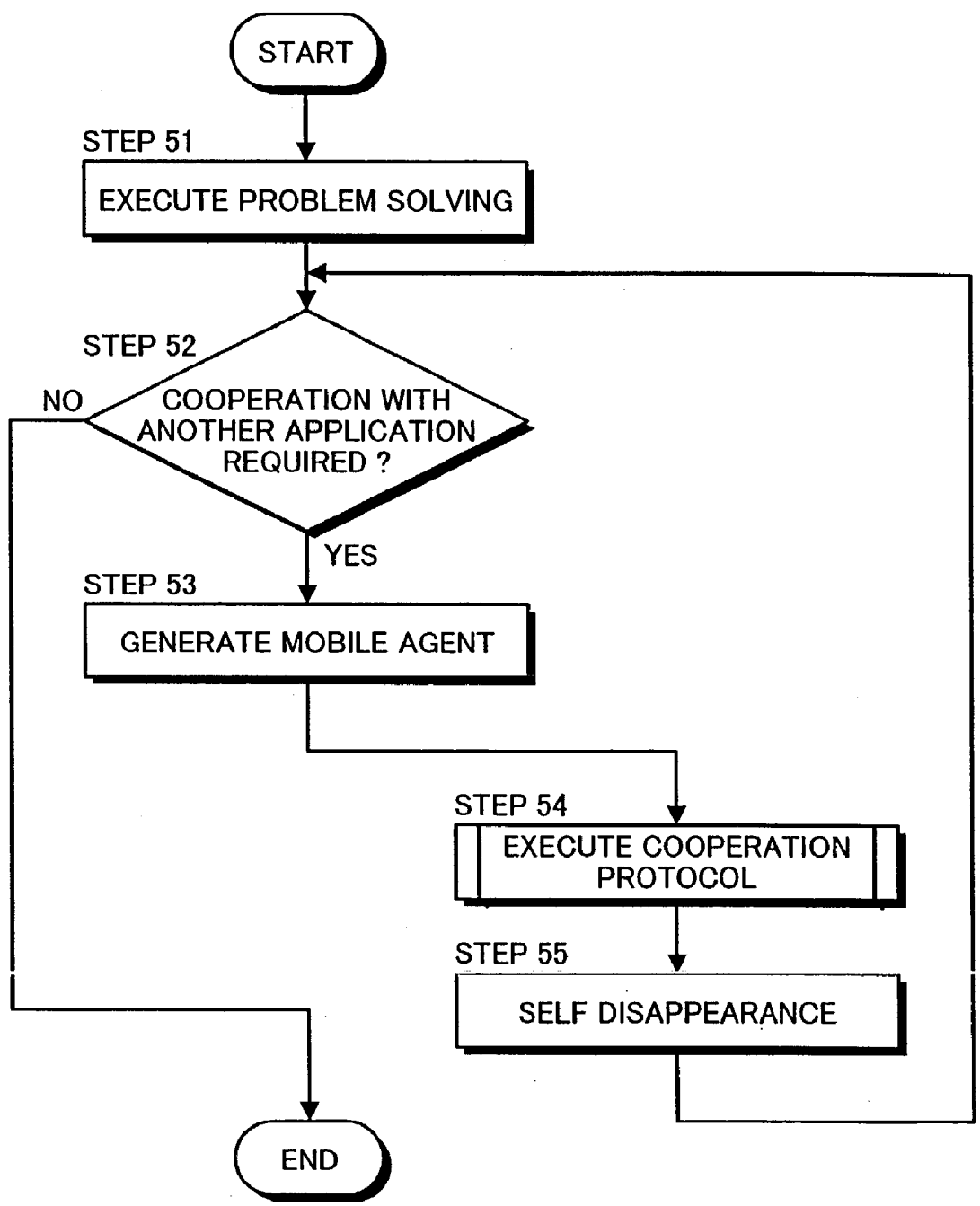
FIG. 5 is a flowchart that shows a general processing procedure in the first configuration of the present invention.

First, the general flow of problem solving in this embodiment is as shown in FIG. 5. Specifically, as shown in this drawing, when each scheduler S is executing problem solving (step 51), if it becomes necessary to cooperate with another scheduler S (step 52), a request is sent to the system so as to cause the generation of a mobile agent MA (step 53). A mobile agent MA that is generated in this manner executes a cooperation protocol so as to perform mediation between schedulers S (step 54), and when the execution of the cooperation protocol is completed, for example, the mobile agent MA itself automatically disappears (step 55).

Further, because the mobile agent MA has this type of cooperation protocol function, at the scheduler S which causes the mobile agent to perform cooperation mediation, even if it is not clear what type of method the other scheduler in the cooperation has, or even if it is not clear as to how that can be used, by using the mobile agent MA in the role of a mediator, it is possible to call and use a required function that the other scheduler has.

For example, in the case in which the other scheduler S is generated as a stationary agent, because the location, that is, the address, of the stationary agent is stored in (notified to) the local system at the time of generation, the mobile agent MA can access this type of stored information to enable a verification of the position of the other scheduler A with respect to which mediation is to be done.

(2-2. Specific Action)

Next, the action of this embodiment will be described in more detail, focusing on the action of the mobile agent MA First, as noted above, each of the schedulers S has a number of variables, and manages the values of these variables. The variables of each of the schedulers S have what the scheduler S takes as being local constraints and also constraints which straddle the local scheduler S and other schedulers S. For this reason, in order to establish variable values, each scheduler S must perform cooperation with other schedulers S, and must make specific variable value settings so that the inter-variable constraints are satisfied.

In this manner, when a scheduler S must perform cooperation with another scheduler S (step 52), a mobile agent MA is generated for the purpose of mediating between the schedulers S (step 53). A mobile agent MA that is generated in this manner executes a cooperation protocol, so as to mediate between schedulers S.

Figure 6:
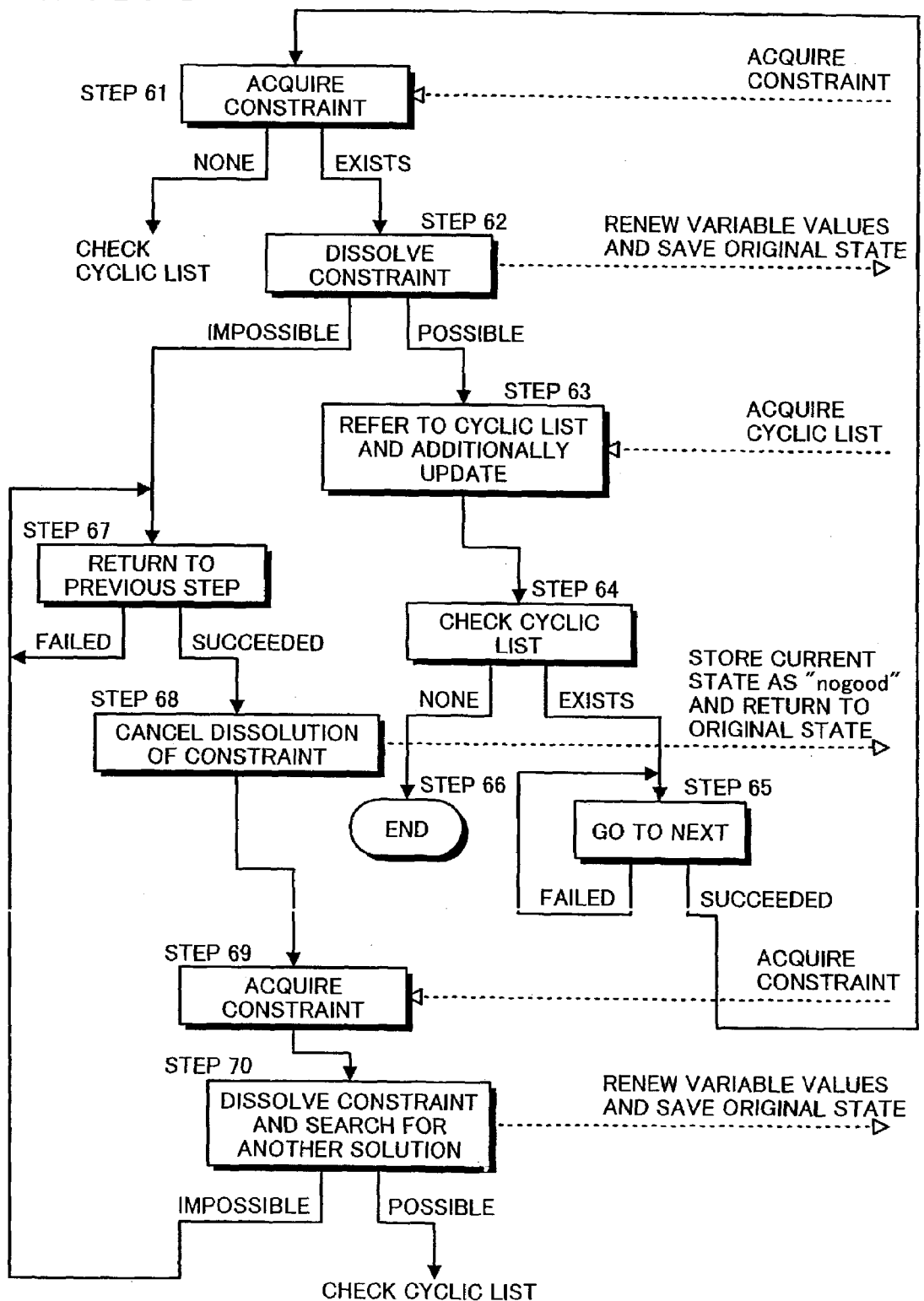
FIG. 6 is a flowchart that shows a cooperation protocol in the first embodiment of the present invention.

An example of a cooperation protocol that is executed by a mobile agent MA in this manner is shown in FIG. 6. This cooperation protocol acquires a constraint of a scheduler S (step 61) and, according to a cyclic list (steps 63 and 64)cycles around each of the schedulers S (step 65), assigning values to variables so as to dissolve constraints, that is, so that the constraints are not violated, thereby searching for a solution (step 62). If the search process reaches a dead-end, the immediately previous value is canceled to backtrack through the processing (steps 67 and 68), so as to search for a different solution (steps 69 and 70).

That is, when the cooperation protocol in this embodiment is executed, at a mobile agent MA the information as to what kind of constraints there are that straddle between the scheduler S that issued output the request and other schedulers S is acquired as constraint condition 1. Furthermore, although it is not shown in the drawing, the cyclic list 2 shown in FIG. 4 minimally has stored init each scheduler S that has variables that are related by constraints.

In the case in which migration enables the dissolution of a constraint (step 62), the cyclic list 2 is accessed (step 63) and, by the action of the migration section 3, migration is done (step 65) between schedulers S that are related by a constraint that is to be dissolved. In the case in which dissolving the constraint is possible without an further migration, the constraint dissolution section 6 dissolves the constraint by actually assigning a value to a variable at step 62 and, in response to this constraint dissolution, at step 63, an additional update is performed with respect to the cyclic list 2.

If a mobile agent MA migrates in this manner, each of the schedulers S discloses to the mobile agent MA the variables and the constraints it has (step 61). Each time a mobile agent MA migrates in this manner between schedulers S, a new variable and constraint is acquired from the constraint acquisition section 5 (step 61), the constraint acquisition section 5 proceeding to assign values to each of the variables (step 62) so that the partial solution attained thus far is not violated. This flow is repeated until either a total solution is obtained, or until a dead-end state is reached.

The dead-end state is a state in which it is not possible to further extend the current partial solution without violating a constraint (step 62). If the dead end state is reached, the backtracking control section 8 returns to the immediately previous processing step (step 67), and pops the original state 7 from the stack, as described above, thereby canceling the last constraint dissolution that was performed (step 68).

Then, the constraint dissolution section 6, with respect to a variable in the immediately previous partial solution that had been pushed onto the stack, assigns an alternate value different from the value that had previously be tried, in an attempt to dissolve the constraint (step 70). When the constraint is dissolved at step 70, processing is performed that is different from the processing that had previously been performed to search for a solution. Note, however, that this is the case of performing synchronized backtracking as a constraint satisfying algorithm in a mobile agent MA, and that it is also possible to use a different constraint satisfying algorithm.

With regard to variables and constraints that are not mutually related, it is possible to use a plurality of mobile agents MA to proceed with independent parallel searches for solutions that are performed simultaneously. When the execution of this type of cooperation protocol is completed, the mobile agent MA itself disappears (step 55 in FIG. 5) or is brought into disappearance by an instruction from the application. Furthermore, in the cooperation protocol that is shown in FIG. 6, if necessary, the acquisition of position information and name information for the other scheduler S for which mediation is to be done and the priority setting of the cyclic list are additionally performed.

(2-3. Solving Method Using a Clone)

Next, the heuristic, or strategy with regard to method of establishing the variables in each of the individual schedulers S is shown, the example being one in which operation of a mobile agent MA is done to include a solving method of distributed constraint satisfaction.

In this example, a strategy with regard to the establishment of variables in a scheduler S is a strategy whereby, when each scheduler S sets values of its own variables, in the case in which there is a plurality of values which can be taken, a selection is made of what criterion is to be used in selecting what value is to be assigned. Examples of this strategy as used in scheduling are done from a variety of standpoints and criteria, such as front padding, rear padding, delivery priority, and minimization of stock.

In the prior art, this strategies are either fixed beforehand or require that the search be done over from the start in order to switch the strategy of a given scheduler. In this embodiment of the present invention, however, in response to the strategy that is taken by each of the schedulers S, by dynamically generating a mobile agent MA clone and branching in the processing, it is possible to execute simultaneous parallel searches for a plurality of strategies.

For example, in a case in which there is a demand for fast response and real-time processing, chiefly in a dynamic environment, in the process of searching for a solution across schedulers S, it is possible to have a case in which a given scheduler S can have two types of strategies it can take, and in which it is desired to take the strategy that finds a solution fastest. In such a case, in this embodiment at the point at which a mobile agent MA migrates to a scheduler S which has a plurality of strategies, by the clone processing section 9 giving an instruction to the mobile agent MA, a done of the mobile agent MA is generated, the original mobile agent MA and the newly generated mobile agent MA being given each separate strategies.

Each of these mobile agents MA, which are given their respective different strategies, perform establishment of variable values in accordance with their given strategies, the subsequent processes of searching for a solution being carried out entirely independently. Then, for example, at the point at which a solution is found in one of the searching processes, the clone processing section 9 gives an instruction to the generation/disappearance section 11, causing it to perform disappearance of the mobile agent MA that had been performing the other search process, the result being that the strategy that determines the solution fastest is selected.

Another case is that in which, for example, it is desired to take a strategy that determines a solution of high quality from a plurality of strategies that can be taken, in which case at the point at which a solution is found by one of the search processes as described above, searching at the other is continued, without disappearance of the other mobile agent MA, the clone processing section 9 making a comparison of the solutions that are obtained by both the searching processes, and selecting the better solution, the result being that it is possible to select a strategy that achieves the better solution.

If we consider only the above-described branching of searching for strategies, implementation is also possible to perform message communication between schedulers S. However, each time there is a strategy branch at a given scheduler S, a stream of message communication is started anew, based on the individual cooperation protocols (constraint solution algorithms), and in order to process these in parallel and simultaneously, it is necessary to build into each of the schedulers S a high-level cooperation function such as a message processing function. It is also necessary to build into each scheduler S the entire required cooperation protocol.

In this embodiment, by using a mobile agent with a capsule type cooperation function to dynamically perform clone generation and migration, it is possible to implement search branching, the result being that the individual schedulers S need only support the very minimum transfer functions with respect to mobile agent MA. Because a mobile agent MA hides a cooperation protocol between schedulers S, it is possible to use a new cooperation protocol when necessary, without the need to build in all the cooperation protocols beforehand.

(2-4. Solving Method Using Merging)

Next, heuristics with regard to the priority of the sequence of establishing variables between schedulers S will be described for the example in which this is included in the solving method by a mobile agent MA.

In the method which uses the priority with regard to the establishment of variables between schedulers S, in the case in which different schedulers S each have a plurality of variables, and in which the priorities of establishing the variables of each are approximately the same, of the variables of these schedulers S, the priority establishes which variables are to be assigned values with higher priority. Typical examples of setting the priority in scheduling include the case in which assignment is made in a sequence starting at earlier processes, and the case in which the assignment is made in a sequence starting at a process near the product.

In the prior art, in the case in which there exists a plurality of variables having approximately the same priority, the sequence was fixed by some sort of criterion, with values being assigned in accordance with this sequence, the result being that although the priorities were approximately the same, compared to a variable that had had a value assigned to it earlier, the condition for a variable that had had a value assigned to it later was quite bad. In this embodiment, however, a mobile agent MA is caused to be generated simultaneously from a plurality of schedulers S, with independent establishment of the variables thereof, the mobile agents MA being merged (integrated) during the search process into one. When doing this, by dissolving a constraint between variables in a manner that minimizes the change, it is possible to improve the efficiency of finding a solution and the quality of the solution.

The following is a simplified example of a method of finding a solution using merging. For example, assume there is a plurality of variables (x, y) having approximately the same priority, and further that there the constraint (x+y=4) exists between these variables. Further assume that each of the variables has a further restraint of taking the largest value in the range 0 to 4. If the fixed priority of each variable is set and values assigned in that sequence, regardless of whether priority is given to x or y, the result is ((x, y)=(0, 4)) or ((x, y)=(4, 0)), so that a great advantage is given to one, while the other is at a great disadvantage, meaning that the final solution also exhibits a skew.

For the same example, in the case in which this embodiment of the present invention is applied, the merge processing section 10 gives an instruction to the generation/disappearance section 11, so that mobile agents MA are generated from both the scheduler S that has the variable (x) and the scheduler S that has the variable (y), the first assignment being the independent assignments of (x=4) and (y=4) values. Then, when the mobile agents MA are merged by the merge processing section 10 giving an instruction to the generation/disappearance section 11, the variables are each changed to a value that has the smallest change while satisfying the constraint (x+y=4). In the above example, by making the value of each of the variables gradually smaller, the ultimately established values are ((x, y)=(2, 2)).

Even in this case in which a gradual adjustment of assigned variable values is done in accordance with priorities, if we consider just this point, it is possible to implement the same type of processing message communication between schedulers. However, this requires that each scheduler be provided with such high-level cooperation functions as a message processing function. In thecae of achieving an implementation by direct message communication between related schedulers, there is the problem that the message communication between schedulers is very frequent.

In contrast to the above, in this embodiment of the present invention, because the implementation is done by mobile agent migration and merging, the individual schedulers S need only support the very minimum transfer functions with respect to mobile agents MA, thereby greatly limiting the increase in the amount of message communication there between.

(3. Application Examples and Experimental Results)

Next, an example of applying a system such as described above to an actual electrical power system facilities power cut plan and the results of experiments with that example, will be described.

In this system, the above-noted first embodiment is installed in the Windows 95/NT™ environment, using the Java™ language, with schedulers that exist at each station being mediated by mobile agents, the result being a power cut plan for work of electric power system facilities support system that implements the solution of a distributed cooperation problem. The schedulers in this system reflect the intentions and strategies of each of the individual stations and manage local power cut plans, and the mobile agents have a method for cooperating between these schedulers and a negotiation strategy encapsulated there within. The scheduler interface is a Gant chart and a dialog box that is used to input and change scheduling data, and such windows as a window to indicate assignment of number of workers.

In the power cut plan for work of electrical power system facilities that is the target in this system, because a power system must supply power 24 hours per day, in suspending various facilities, it is necessary to satisfy various constraints between related facilities. Because the various facilities are managed in a distributed manner at the various stations at which they exist, local constraints of the stations to which they belong must also be satisfied.

In the case of representing this type of power cut plan for work of electrical power system facilities as a distributed constraint satisfaction problem, variables correspond to facilities that exist within the system, and the values of variables correspond to the day and time for suspending each of the facilities. More specifically, this is represented as a pair of variables that indicates the starting date and time of power cut and the ending date and time of power cut. In general, the following type of constraints can be given as examples.

(1) Simultaneous Power Cut Prohibition Constraint

Two or more facilities that are listed in a simultaneous power cut prohibition list must not be suspended simultaneously.

(2) Grouping Constraint 5

The power cut of facilities at two or more locations is to be done during the same period if possible.

(3) Worker Headcount Constraint

The number of workers required for each of the facilities is defined, and the required number of workers must not exceed the number of workers present from the operating company on that particular day.

(4) Work-Prohibited Day Constraint

Facilities shall not be suspended during periods of long holidays or times during which a high load is expected. The data in this application example was prepared based on actual system data, in terms of both system configuration and scale, on the premise that the system would be applied to a real electrical power system owned by an electrical power company. Specifically, the number of stations was 10, and the total number of facilities was approximately 200. The power cut plan for each of the facilities was generated at a pace of one time per month, and the working period was between 1 day and 1 week, depending upon the work to be done. The schedule was proposed for a period of 1 year. These settings are quite usual when compared with actual problems, and are appropriate as an example of a distributed constraint satisfaction problem.

Next, in an application example such as noted above, an experiment to determine a solution using clones in the above-noted first embodiment (Experiment 1), an experiment to determine a solution using merging (Experiment 2), and the experimental results will be presented.

(3-2. Experiment 1, Using Clones)

(3-2-1. Details of Experiment 1)

In Experiment 1, in the above-noted application example, heuristics for a strategy with regard to a method of setting variables in each of the schedulers is included within a solution method that uses cloning, as described in the first embodiment, thereby improving the efficiency of finding a solution.

In this experiment, a mobile agent clones itself in response to strategies that each of the schedulers can take, and performs branching of the search processing, with a plurality of searches being performed in parallel simultaneously for the strategies that can be taken. In this application example, a comparison is performed with the case in which a solution is searched for without performing branching with clones, the actual amount of time required to achieve constraint satisfaction being measured and compared.

In this Experiment 1, the initial schedule of each scheduler was generated randomly and, of facilities that straddle between schedulers, an attempt was made to dissolve a number of constraints that are related to approximately 10 facilities (variables). Note that the approach taken was that of adopting the original schedules that were generated at the individual stations with priority if possible, so that the amount of movement of facilities (values of each variables) was minimized. In the case in which a single mobile agent searches for a solution without performing branching, the search at each scheduler is performed first in the forward direction and then in the backward direction to sequentially search for an arrangement that has a minimum amount of migration. In the case in which an arrangement that satisfies the constraints does not exist, the mobile agent is backtracked, and return is made to the immediately previous scheduler.

In the case in which a clone of a mobile agent is generated and branching of the search processing is done, the agent proceeds with the search in the same manner and, at the point at which backtracking is done so as to return to the immediately previous scheduler, if selection is possible from a plurality of strategies, a local clone is generated and the processing is branched.

In this Experiment 1, as a strategy with regard to the method of establishing a variable in a scheduler, in the case in which there is a violation of a simultaneous power cut constraint, a selection can be made either shifting the facilities arrangement forward or shifted the facilities backward. Additionally, in Experiment 1 while the number of workers constraint and the work-prohibited day constraint are also dealt with, it is assumed that there is no strategy branching with regard to these.

(3-2-2. Results of Experiment 1)

Figure 7:
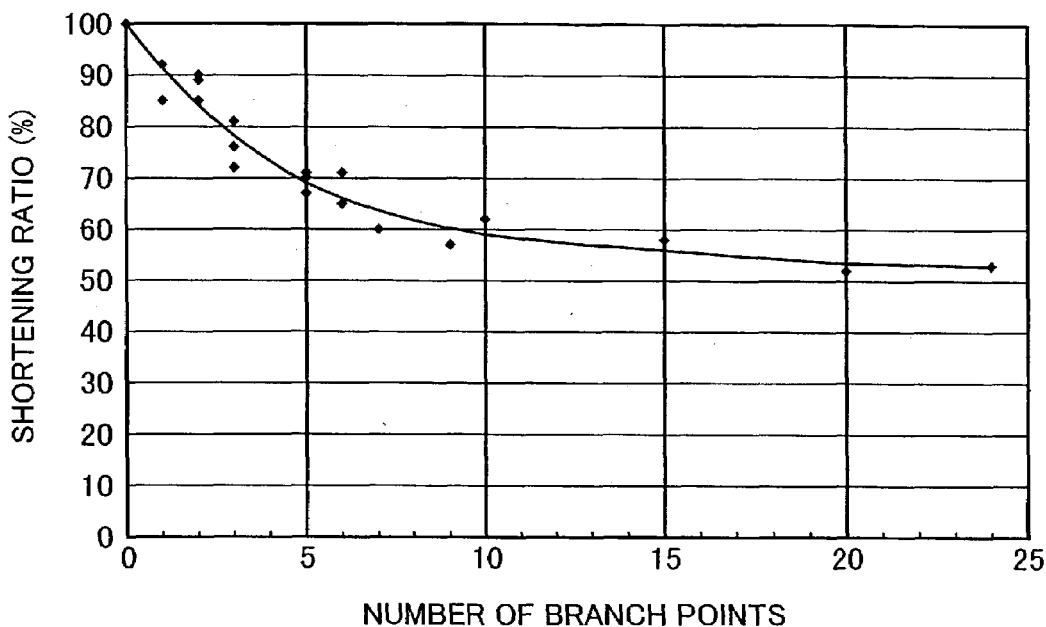
FIG. 7 is a graph that shows a result of an experiment 1 in an example, to which the first embodiment of the present invention is applied.

The results of the above-noted Experiment 1 are presented in graph form in FIG. 7, which shows a comparison of the efficiency of searching for a solution for the case in which a clone is used with search branching and the case in which a single agent is used for searching. In this graph, the vertical axis represents the actual measured time that was required to dissolve a constraint for the case of using a clone with search branching, as a ratio with respect to the time required to search for a solution using a single agent, which is taken as 1, thereby representing the degree of shortening of the search time. The horizontal axis shows the number of branch points, this being the number of times an agent generates a clone. For the case in which the number of branch points is zero, that is, the case in which a single agent executes the search, the actual measurement time is taken as 1.

From the experimental results, it can be seen that, for the case in which a clone is used with search branching, compared with sequential searching using a single agent, even in a problem of the scale of actual problems, with a practical number of clones such as 5 to 10, it is possible to shorten the search time by 30% to 40%.

In the above-noted experiment, between the case in which the critical path has a variable with high priority and the case in which it has a variable of low priority, there is a great difference in the ultimate number of agents and ratio of shortening of the time required to dissolve constraints. In general, in the case in which the critical path has a variable with a high priority, because the method of this experiment was to generate a clone at the point of backtracking to the immediately previous scheduler, sequential branching is done from a variable of low priority, thereby requiring a large number of mobile agents.

However, the higher the priority of the variable at the branch point, the higher is the ratio of shortening the time required to dissolve a constraint, and this ratio approaches 50%. In contrast to this, in the case in which the critical path has a variable of low priority, although the number of clones generated is small, the ratio of shortening the time to dissolve a constraint is also small. However, it should be noted that this is because, in the method of the experiment performed as described here, return is made to the immediately previous scheduler by backtracking, at which point a done is caused to be generated. In a more realistic problem, a method can be envision in which the critical path position can be predicted from, for example, domain knowledge, at which active generation of clones is done, thereby achieving efficiency.

(3-3. Experiment Using Merging)

In Experiment 2, heuristics with regard to the priority of the sequence of establishing values of variables that straddle schedulers are included in the method of solution, this resulting in an improvement in the quality of the solution.

(3-3-1. Details of Experiment 2)

In this application example, mobile agents are generated simultaneously by a plurality of schedulers that have approximately the same priority, and the values of each of the variables are established independently. Then, mobile agents are merged during the search process, and the constraints between variables thereof are dissolved in a manner that minimizes the change for both. This application example was compared with the case of a single mobile agent assigning a sequence by some sort of criterion to a plurality of schedulers that have approximately the same priority, values being applied in accordance with this sequence.

In terms of implementation, in the case in which there exists a plurality of stations that have facilities having approximately the same priority, it is not desirable to have a situation in which one station is at a great advantage, but another station is at a great disadvantage. Because of this, in Experiment 2 the above-described example of grouping constraint was taken, the power cut plan for a plurality of facilities having the same priority being taken as the distribution of the number of movement days from the original position of each facility when the facilities to be suspended are grouped. With respect to execution using a single mobile agent, in the case of execution with merging, this indicates how much variation there is in the amount of movement between stations.

In the above, however, the priority of each of the facilities is established beforehand, and it is assumed that the relationship of correspondence between stations and facilities is known. While Experiment 2 deals with the simultaneous power cut constraint and the number of workers constraint, it is assumed that merging is not done with respect to these constraints.

(3-3-2. Results of Experiment 2)

Figure 8:
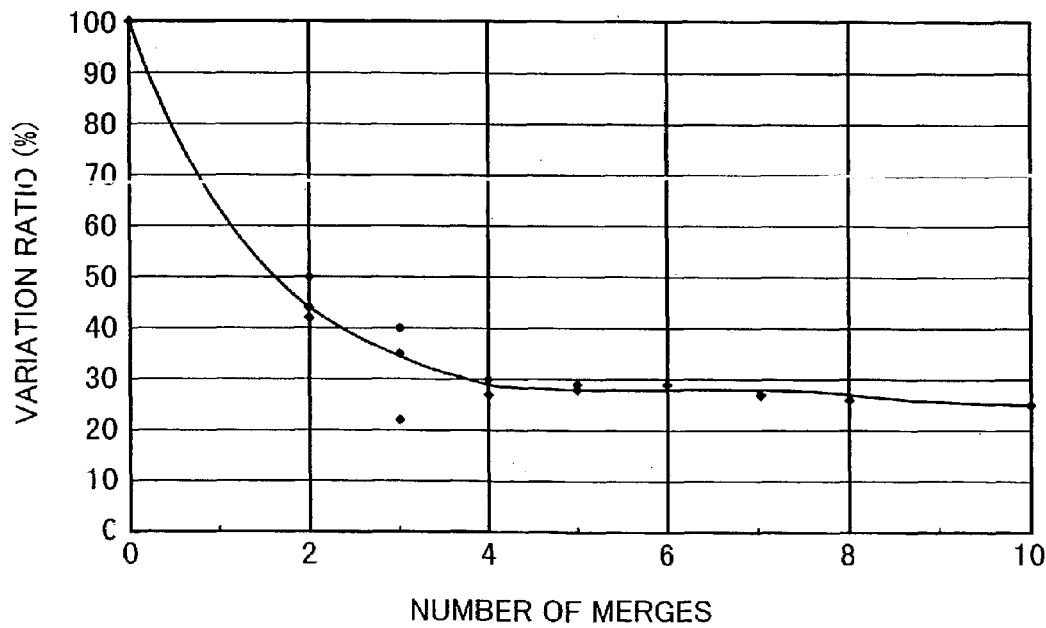
FIG. 8 is a graph that shows a result of an experiment 2 in an example, to which the first embodiment of the present invention is applied.

The results of the above-noted Experiment 2 for the case of removing a constraint between variables using merging and the case of using a single agent to perform sequential assignment are shown as a comparison in the quality of the solution in the graph of FIG. 8. In this graph, the vertical axis represents the variation (standard deviation) in number of movement days from the original position of each facilities when the grouping constraint is dissolved, compared with the case of using a single agent to perform sequential assignment, the latter case taken as 1, so that the graph represents the degree of shortening. The horizontal axis represents the overall total of facilities that were merged. That is, in the case of zero merges, that is, the case in which a single, agent is used to perform sequential assignment, the variation is 1 (100%).

From these experimental results, it can be seen that, between the case in which merging is used to dissolve constraints between variables and the case in which a single agent is used to perform sequential assignment, compared to the case of using a single agent to perform sequential assignment, it is possible to greatly reduce the number of movement days between schedulers (stations). This indicates that, for the case in which there exists a plurality of stations that have facilities having approximately the same priority, it is possible to establish a schedule that treats each of the stations equally (4. Effect)

As described above, in the first embodiment of the present invention, by having an agent mediate the cooperation between a plurality of schedulers S (applications), it is possible to implement exchanges between the schedulers S and overall management thereof, the result being that it is not necessary that each of the schedulers S is given a high degree of autonomy, such as a complex cooperation protocol. For this reason, existing applications such as schedulers that are used individually, can be used as bases to be combined with each other, resulting in easy construction of systems such as distributed and cooperative type of scheduling systems.

In this embodiment of the present invention, because the cooperation protocol is encapsulated in the agent, additions and changes of the protocol are facilitated. Specifically, it is possible to install constraint satisfaction algorithms or the like that is best suited for the dissolution of various constraints, and then selectively use these, in accordance with the purposes and situations.

By building different cooperation protocols into each of the mobile agents respectively, and selectively using these in response to specific situations, it is possible to dynamically add new cooperation functions to the individual schedulers. This means that it is possible to hide a cooperation protocol between schedulers, facilitating the use of a new protocol without being bound by an existing protocol.

In this embodiment of the present invention, by having a scheduler generate an agent in response to a need, it is possible to use a desired cooperation protocol, thereby improving the flexibility of operation. In this embodiment, by attempting to extend a partial solution or assign alternate values by a processing procedure that follows a synchronized backtracking algorithm, it is possible to achieve an effective solution to a constraint satisfaction problem.

Additionally, in this embodiment, when there is a plurality of alternatives such as with regard to the criterion to be used in selecting from a plurality of variable values or with regard to the sequence of establishing variable values, by having clones of separate agents perform parallel searches for solutions when each of the various options is selected, and merging the results into one result, it is possible to have the processing of a distributed constraint satisfaction problem reflect heuristics, thereby improving the efficiency of the search for the solution and the quality of the solution.

In particular in the embodiment, when there exists a plurality of values that can be assigned to a variable and there is a plurality of strategies for selecting the criterion of value assignment, a plurality of agents in accordance with each of the strategies is used to independently and simultaneously search for a solution. By doing this, the heuristics of a strategy with regard to the method of establishing variables (criterion for variable selection from candidates) is reflected in the distributed constraint satisfaction problem, thereby improving the efficiency of the search for the solution and the quality of the solution.

In the above case, of the agents that correspond to each strategy with regard to selection of a criterion for selection of a variable from candidates, if other agents are brought into disappearance when one solution is obtained, the processing ends quickly and the burden on the system is reduced. In another example of this embodiment of the present invention, if the best solution is selected from among a plurality of solutions based on each strategy with regard to the criterion for selection of variables from candidates, the quality of the solution is improved.

In this embodiment of the present invention, in the case in which the priorities for establishing which scheduler's variable is to be established first in the variable setting sequence are approximately the same, a solution is searched for by performing independent simultaneous searches by a plurality of agents, for the cases in which each is set first. In this case, each of the agents simultaneously and in parallel searches a space of the possibility of a solution after a branch representing the sequence of establishing variables. Then, by gradually coordinating the variables that are included in the solutions obtained by the various agents and merging the search results, the heuristics of priority with regard to the sequence of establishing variables are reflected in the distributed constraint satisfaction problem, thereby improving the efficiency of the search for the solution and the quality of the solution.

Furthermore, while in the above-described merging, there is the possibility that some time will be required for constraint dissolution at the point of gradual coordination of the assignment of variable values, if this method is combined with the above-described improvement in searching efficiency by using cloning, the required time is also reduced, thereby achieving a further improvement in effect.

In this embodiment, because mobile agents which can migrate to each of the schedulers S are used, it is not necessary to built a high-level message routine into each of the schedulers S, thereby facilitating the configuration of a distributed-type scheduling system using an existing scheduling system. Also, because there is no need for each scheduler S to have a message routine built into it, there is no restriction to schedulers which have a cooperation protocol built into them beforehand, thereby enabling flexible operation, such as by causing a mobile agent MA to execute a cooperation protocol in response to a specific purpose.

Additionally, in the case in which frequent data transfer between schedulers S is performed, such as when performing gradual variable coordination, the mobile agent MA serves to perform this data transfer. For this reason, the burden on the scheduler S is reduced, as is the amount of communication on the network N, thereby eliminating system bottlenecks and improving system throughput.

In particular in the case described above, in which heuristics for a strategy for selecting variable values from candidates or for the sequence of establishing variables is to be built into the method for solving a constraint satisfaction problem, because the processing related to these heuristics is substantially localized, it is possible to perform parallel processing. In this embodiment of the present invention, this type of processing, which can be performed in parallel, can be implemented by natural modeling as the operation of separate mobile agents MA. For this reason, it is easy to configure software that causes the heuristics to be reflected in the method of solving a constraint satisfaction problem, and there is an improvement in the ease of maintainability and extendibility of this software.

In addition, in a case in which network problems, for example, cause the abnormal termination of processing for search branching that is performed based on a given strategy by a given mobile agent MA, the influence that this has is limited to the minimum, this being influence on that mobile agent MA and that strategy, so that there is no propagation of problems to other schedulers S or mobile agents that have other strategies, the result being a minimum erect on the overall processing.

(5. Other Embodiments)

In the present invention, distributed processing technology related to constraint satisfaction problems is not restricted to the first embodiment described above, and includes also the following types of other embodiments. For example, rather than a constraint satisfaction problem, the present invention can be applied as well to other desired fields. Additionally, there is freedom with regard to the type of application. For example, it is possible to freely select agents and objects. It is also not necessary for the agent that performs mediation between applications to be a mobile agent, and also there is freedom with regard to whether a single agent or a plurality of agents is used.

Note also that the configuration that is shown in FIG. 1 through FIG. 4 and the processing procedure that is show in FIG. 6 are no more than examples, it being possible to freely change, within the scope of the present invention, the configuration and processing procedures. For example, it is possible to freely change the contents and format of the target knowledge, problem-solving knowledge, cooperation problem solving knowledge, and the like. Note also that it is not absolutely necessary to generate agents in correspondence to a plurality of alternatives and have the heuristics reflected in the distributed constraint satisfaction problem solving method. Even in a case in which such heuristics are included, the criterion for selecting variable values and sequence of establishing variables are merely examples of heuristics, it being possible to have other desired heuristics reflected in the solving method.

In the above-described first embodiment of the present invention, while the specific example of a cooperation protocol is that of a constraint satisfaction algorithm that uses synchronous backtracking, the cooperation protocol is not restricted to synchronous backtracking, nor is there a restriction to constraint satisfaction algorithms. That is, it is possible to use, for example, a contract net algorithm as the cooperation protocol.

For example, in the case of using such a contract net protocol, a stationary agent such as a scheduler that wishes to issue a task announcement (bid announcement for requesting processing) generates a mobile agent, the generated mobile agent then cycles around other stationary agents that have a possibility of bid. When this is done, the mobile agent notifies each of the stationary agents of the details of the request and collects bids therefrom, after which it returns to the stationary agent that generated it and passes over the contents of the bids. The stationary agent performs a comparison among the bids that were collected by the mobile agent, selects an awardee, gives the actual task to the mobile agent, and causes it to go again to the selected awardee, at which the actual processing is performed.

In the description of the above-described first embodiment, the example is that in which the agent itself performs processes for removing a constraint condition, that is, a process of receiving a constraint condition and variables from a scheduler, a process of generating and extending a partial solution, and a process of attempting to assign alternate values when it is no longer possible to extend the partial solution. It is not, however, necessary that these processes are performed directly by the agent itself. That is, there are cases in which there is cooperation between a constituent element such as an application that is dedicated to the processes for the dissolution of constraints and an agent so as to find a solution of the problem, and such a case would be encompassed in the scope of the present invention.

2. Second Embodiment (1. Configuration)

(1-1. General Configuration)

Figure 9:
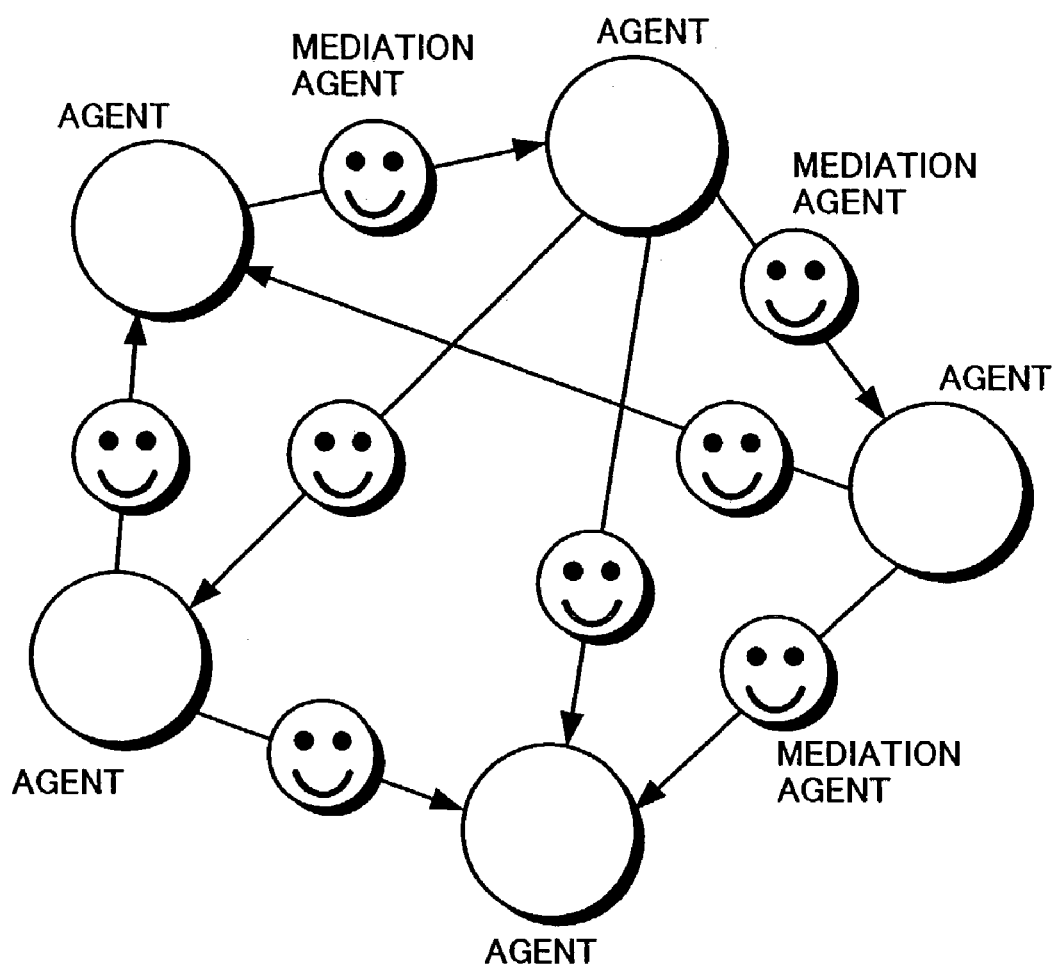
FIG. 9 is a conceptual view that shows an example of the configuration of the second embodiment of the present invention.

FIG. 9 is a schematic conceptual view depicting the general configuration of an information processing system for information processing by means of a plurality of distributed constituent elements in one embodiment of the technical means more readily permitting more flexible bonding of a plurality of existing systems. More specifically, FIG. 9 depicts a simplified view of the inventive configuration, wherein a distributed system is composed of a plurality of agents and wherein a number of mediation agents perform coordination among a plurality of these agents.

Figure 10:
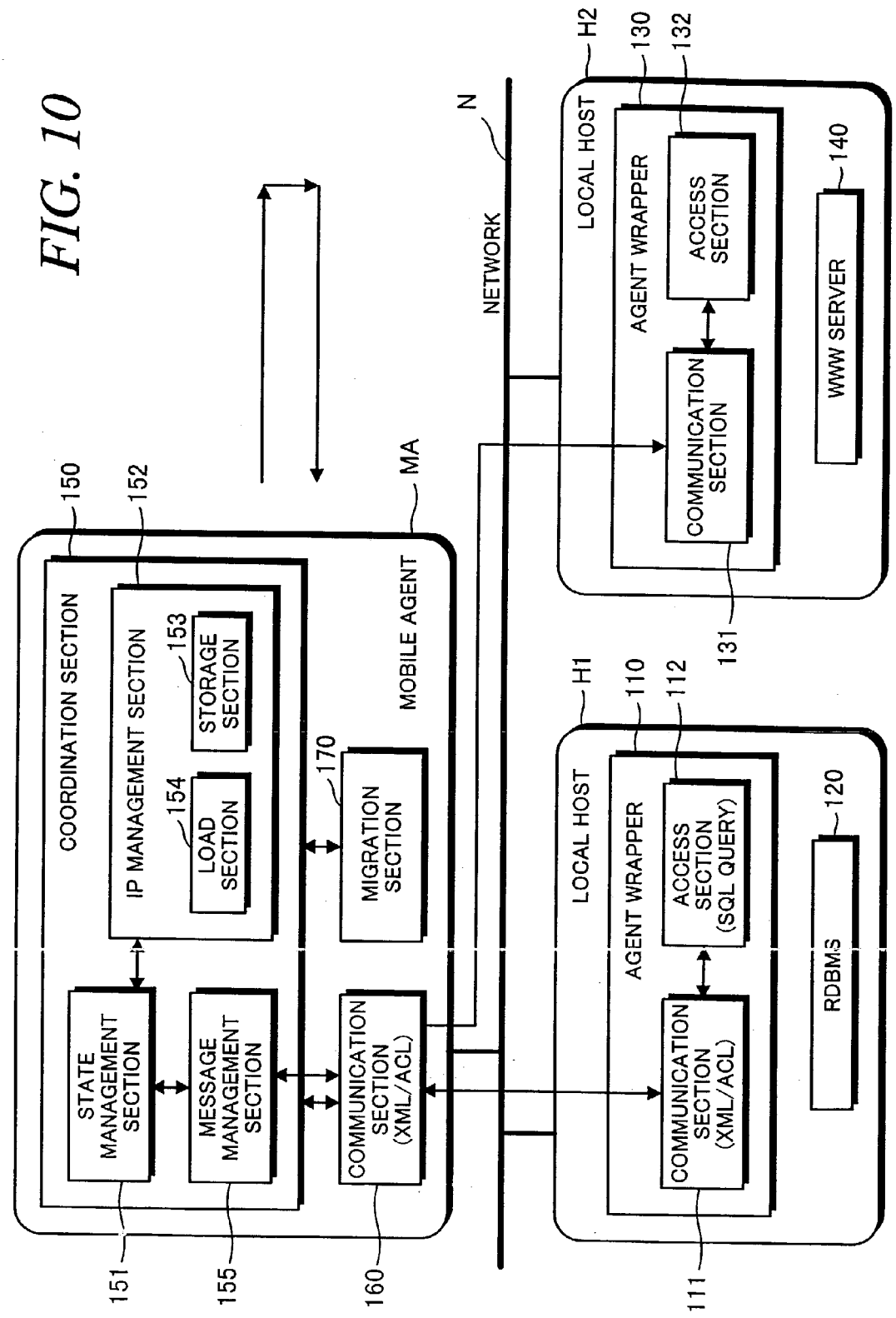
FIG. 10 is a block diagram that shows the configuration of the second embodiment of the present invention.

Furthermore. FIG. 10 specifically depicts the configuration of the present embodiment. In other words, in the embodiment, the distributed system (sometimes referred to as present system hereinafter) is composed of a plurality of constituent elements, namely local hosts H1, H2 (corresponding to the nodes described above) performing processing relevant to applications and database, agent wrappers 110, 130 to connect together the local hosts through network N, and mediation agent MA performing cooperative processing through the coordination between these individual constituent elements through these wrappers 110, 130.

Among them, the agent wrappers 110 and 130 are in a common configuration; for example, the agent wrapper 110 comprises a communication section 111 primarily performing a communication function with the mediation agent MA, and access section 112 as a native means for connecting the agent wrapper 110 to the target RDBMS (relational database management system). In other words, by the term native means is represented a means operating according to processing procedures intrinsic to each application or each local host.

Particularly, the communication section 111 serves as a first communication means for communication with the mediation agent MA according to a predetermined format, while the access section 112 performs local processing of the individual constituent elements, such as SQL query for database and http access to web servers.

Still furthermore, the mediation agent MA comprises coordination section 150, communication section 160 and migration section 170. Among them, the communication section 160 performs a communication function for communication between the mediation agent MA and the wrappers 110, 130 according to the predetermined format, so the communication section 160 can be designated as a second communication means. Herein, the term communication specifically means the exchange of messages between the mediation agent MA and the agent wrappers 110, 130. Meanwhile, the migration section 170 carries out a migration function for the migration of the mediation agent MA between the wrappers in connection to the network N; and the migration section serves as a migration means for the mediation agent to migrate between the hosts H1, H2 as the nodes.

Then, the coordination section 150 corresponds to a coordination means for performing a coordination function among the individual constituent elements, mainly for the purpose that the distributed system can wholly carry out the operation in a coherent manner; more specifically, the coordination section 150 can perform coordination among the individual constituent elements when the mediation agent MA follows the IP integrated in the MA per se. The wrappers 110, 130 can be designated as platforms permitting the operation of a plurality of mediation agents MA, MA, - - -, in a simultaneous manner or in an exclusive manner.

(1-2. Specific Configuration of Coordination Section)

Next, the configuration of the coordination section 150 is more specifically described below. The coordination section 150 comprises IP management section 152 and state management section 151. The IP management section 152 in particular serves as a control means to control IP so that the IP can perform coordination among the individual constituent elements. The coordination section 150 is additionally in such a configuration that the state of the present system and individual states incorporated in the IP can be processed in a format expressible in a state transition diagram; and the state management section 151 serves as a state control means for the fulfillment of the coordination through the control of information processing on the basis of the IP.

Additionally, the IP management section 152 is equipped with storage section 153 and load section 154. The storage section 153 serves as an IP-storing means and the load section 154 serves as a load means calling for a necessary IP from the storage section 153, depending on the current state, and forwarding the IP to the state management section 151. Then, the storage section 153 is in a configuration such that IP is stored therein per unit assembly of plural states; additionally, the state management section 151 is in a configuration such that on the premises preliminarily set individually to the plural states, a state suitable for the current information processing state is called up from IP and the called state is then applied to the current information processing state.

Furthermore, the coordination section 150 is equipped with a message management section 155 functioning as a means for retaining messages on receipt and returning a message in conformity with a query from the state management section 151, so the message management section 155 serves for accurately retaining the context of a series of conversations between individual local hosts H1, H2 as the constituent elements of the present embodiment and thereby progressing the processing.

The mediation agent MA equipped with such coordination section 150 then provides a coordinating function so as to achieve cooperative problem solving between the constituent elements of the distributed system. Due to the coordinating function in the present embodiment, the Speech-Act-based messages between the agent wrappers 110, 130 and the mediation agent MA are dependent to each other. The coordination function is distinctively defined by IP, as described below.

(1-2-1. IP)

Essentially, the concept of IP is based on the organization theory proposed by Fox et al. (see References: Fox, M. S., "A Common-Sense Model of the Enterprise Proceedings of Industrial Engineering Research Conference", pp. 178–194, 1993; Fox, M. S., Barbuceanu M. and Gruninger M., "An Organization Oncology for Enterprise Modeling: Preliminary Concepts for Tmking Structure and Behavior", Proceedings of the Fourth Workshop on Enabling Technologies, Infrastructure for Collaborative Enterprises, IEEE Computer Societh Press, pp. 237–251, 1995).

IP serves for the examination and management of a coordination problem between different subjects at an organization level, on the basis of the knowledge about the mutual action process between the subjects. IP falls under so-called top-down approaches. IP expresses the mutual action process in the style of conversations between the subjects on the basis of the message exchange rule based on Speech-Act.

The IP can also be designated as a plan proposed by each subject for attaining a certain purpose under mutual actions with others. In many cases, the IP is represented as finite state machine including the potential states of the subject, the actions at those states and the transition to the next state. In this case, the autonomy of each subject can be exerted when the subject selects the next state with possible occurrence of the transit.

Figure 11:
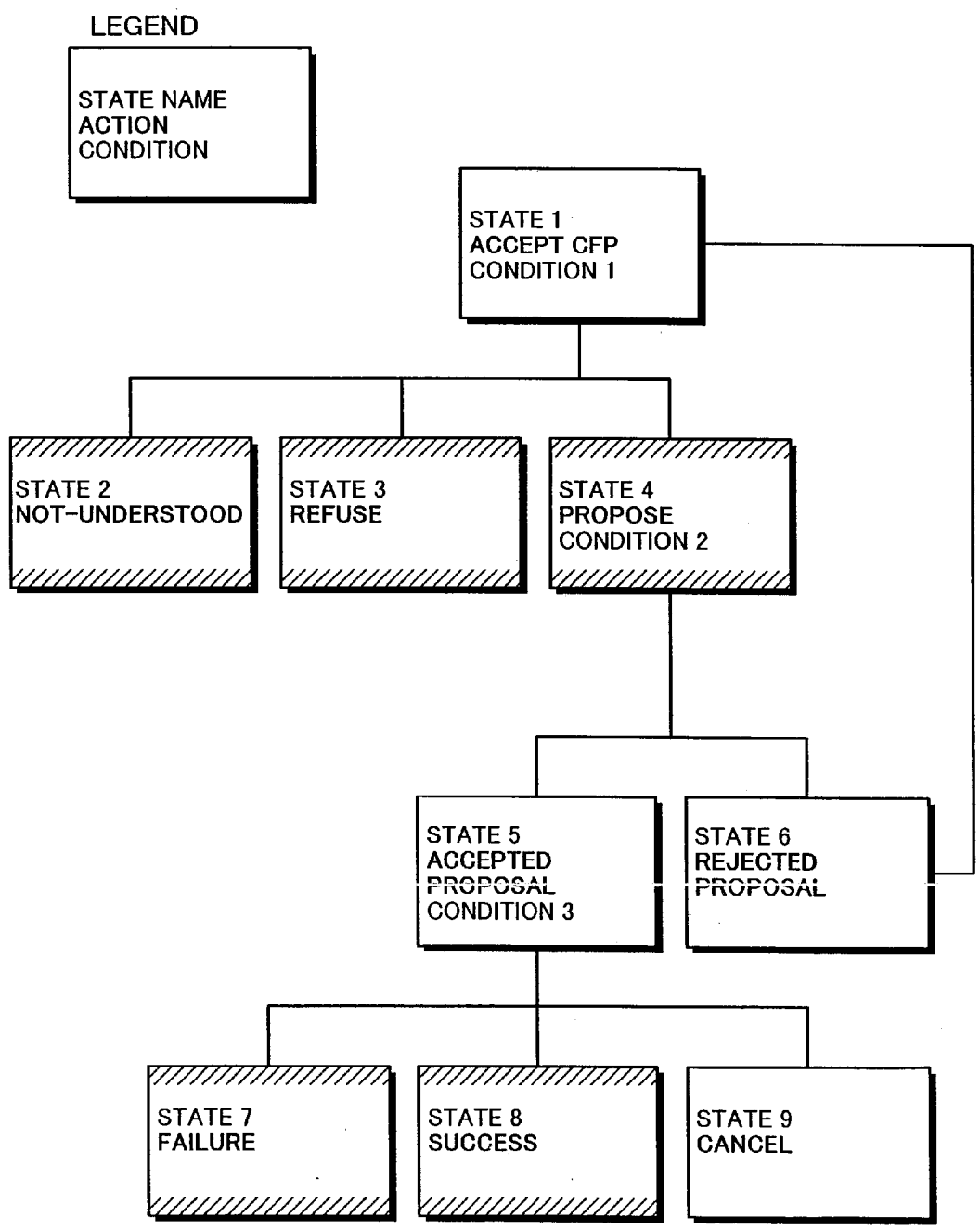
FIG. 11 is a conceptual view that shows an example of IP, which is under modeling as a type of state transition diagram.

Additionally, research works have been under way to dynamically rewrite the state transition following IP execution (see Reference: Martin, F J., Plaza., E., Rodriguesz-Aguilar, J. A., and Sabater, J., "JIM: A Java Interagent for Multi-Agent Systems", Proceedings of the AAAI-98 Workshop on Software Tools for Developing Agents, 1998). FIG. 11 depicts one example of IP modeled in a type of state transition diagram.

(1-2-2. IP Unification)

In the present embodiment, IP over problem solving procedures for information processing by means of a plurality of constituent elements is separated from local processing intrinsic to each constituent element, whereby the IP can be unified.

As described in the sections "Prior Art and Problems thereof", the conventional agent development tool providing a coordination function supports a method for integrating IP into each subject. In many cases, however, very complicated works have been needed so as to integrate an appropriate IP into a plurality of subjects with no occurrence therein of mutual inconsistency.

A main reason thereof resides in that IP integration into each subject requires that a mutual action process at an organization level should be decomposed into interactions between a subject and another subject. So as to specifically prepare an IP per each subject unit, first, an initial state should be determined; at the state, then, a combination of potential actions to be possibly triggered by the subject and possible messages from others is determined; and thereafter, a plurality of the subsequent states should be decided, depending on the combination. A plurality of the subsequent states should be set per each of these states described above; and the procedure should be repeated until all the states reach the preliminarily determined termination state. After the procedure is executed for all the subjects, these states are linked together in series, to be then examined as to whether the overall coordination is established therein. Such procedures are carried out not only at the initial stage of development but also when it is desired to additionally modify problem solving procedures once executed.

Another reason why the IP preparation is so complicated lies in that IP comprises a mixture of processing for problem solving procedures and local processing with dependency on each subject. For example, a search method depending on the DB type, initialization processing and termination processing, belong to the local processing unique to the subject. Alternatively, a series of procedures for executing a necessary action depending on the message and subsequently sending back the outcome, mostly belong to the series of problem solving procedures in common to other subjects.

Thus, the present embodiment proposes how to unify IP and an architecture in conformity with the unified IP. In other words, in the embodiment, IP is separated into one part for processing with regard to problem solving procedures and the other part for local processing. Thus, the IP relevant to problem solving procedures can be unified.

Furthermore, the architecture comprises a mobile-type mediation agent MA with the IP unified with regard to problem solving procedures and the individual agent wrappers 110, 130 with the IP describing local processing. Then, the mediation agent presents how to solve the problem according to such IP and gives an instruction as to what the individual wrappers 110, 130 should do next, thereby promoting cooperative processing, whereby mutual coordination among individual subjects can be attained with no integration of complicated IPs into the individual constituent elements of the distributed system.

The term IP unification with regard to problem solving procedures means the examination of the mutual action process at an organization level in a crosswise manlier over subjects from the standpoint of the agents with autonomous mobility, with no decomposition procedure of the process into interactions between each subject and other subjects. More specifically, the substitution of between-subject message exchanges with the migratory operation of the mediation agent MA loaded with the intention of a message sender enables to link together IPs having been allocated to individual subjects. Herein, the state of the mediation agent MA represents the progress of problem solving procedures.

As shown in the conceptual view of FIG. 12, this means that longitudinal IPs per subject is substituted with crosswise IPs among subjects. In the present embodiment, such IP thus prepared permits more simplified incorporation of the conceptual idea of a designer or programmer.

(1-2-3. Specific Procedures of IP Unification)

An example as to how to unify IPs is now described hereinbelow.

(1) Determination of constituent elements of distributed system First, the purpose and to-be-provided services of a distributed system should be determined. Then, constituent elements required for the system, for example, customer database (DB), search engine, world wide web (WWW) server, are determined. It is needless to say that as the constituent elements composing the system, existing constituent elements can be used, satisfactorily. Other constituent elements will be developed in near future and these may additionally be used alike.

(2) Designing of mutual action process among constituent elements Using subsequently the knowledge regarding the functions of the individual constituent elements of the distributed system, a flow of the mutual actions should broadly be designed, so as to realize the intended services. Generally, the flow of the mutual actions is expressed as a simple work flow or an algorithm satisfying the constraint.

(3) Designing of unified IP for problem solving procedures Based on the mutual action process among the constituent elements, thereafter, IP representing the problem solving procedures for the mediation agent is specified. So as to prepare a series of IPs with regard to problem solving procedures, herein, a combination of actions at a state with the emergence of a problem occurring in a certain constituent element as a start point and the outcomes is determined, to determine then the next state, depending on the combination.

Nevertheless, the IPs of individual constituent elements are linked together through the migration of the mediation agent MA. A case is now exemplified, wherein a constituent element A sends a message asking for an action 1 to another constituent element B and the constituent element B executes the action 1 and then executes an action 2 based on the outcome of the executed action 1. According to the prior art, the constituent elements A and B operate independently on the basis of their unique IPs in the exemplified case.

Alternatively, in the present embodiment, the IP unified with regard to problem solving procedures works as follows. First, on detection of the state of the constituent element A or on receipt of a certain event from the constituent element A, the mediation agent MA determines to ask the constituent element B for the action 1. Then, the mediation agent MA per se migrates to the constituent element B, to instruct the execution of the action 1 thereto. Additionally, the mediation agent MA receives the outcome from the constituent element B and then orders the execution of the action 2. When another processing is required because of the occurrence of some influence during IP execution or when the processing should be branched, another mediation agent is allowed to generate to be involved in the processing.

The IP for problem solving procedures is terminated, just when an action required on the basis of the mutual action process among the constitutive elements is not any more present. The initial state and termination state of each constituent element or the local processing procedures for the execution of the actions designated by the mediation agent MA are described in the access sections 112 and 132 in the agent wrappers 110 and 130, respectively.

(1-3. Specific Configuration of Communication Section)

Individual communication sections 111 and 131 between the mediation agent MA and the agent wrappers 110 and 130 provide a communication function for information exchange among the constituent elements of the distributed system. The communication function is now described. More specifically, the communication function supports the Speech-Act-based message exchange between the agent wrapper 110 or 130 and the mediation agent MA. Herein, the support is limited to the message exchange between the agent wrapper 110 or 130 and the mediation agent MA present physically therein, with no support of the message exchange between the agent wrappers 110, 130. Additionally, the message exchange is done in a style of synchronized/non-synchronized communication.

Further, ACL (Agent Common Language) (see Reference: "FIPA97 Specification", http://www.cselt.it/fipa/spec/fipa97.htm, 1997) is adopted as the communication language. ACL was developed on the basis of KQML (see Reference: Finin, T. and Wiederhold, G., "An Overview of KQML: A Knowledge Query and Manipulation Language", Department of Computer Science, Stanford University, 1993) according to the Speech-Act theory.

The ACL is composed of the following three elements:

(1) external language (ACL) expressing the intentions of the agents;

(2) internal language encoding the information to be exchanged between the agents; and (3) ontology (vocabularies) suitable for common application area. The contents language and the ontology can independently be extended. Furthermore, the message format is defined by xiVWACL expressing the ACL logic structure in XML (see Reference: "Extensible Markup Language (XML) 1.0", http://www.w3org/TR/REC-xmlXML, 1998). One example of XML/ACL expression is illustrated in FIG. 13.

Such ACL expression in XML has the following advantages:

(1) development environment including editor and parser has already been accommodated;

(2) mutual connection through DTD transform with other communication standards based on XML can be established; and (3) hyper-link function in the XML-relevant standards can be used as ontology transform function. Following the message transmitted through such communication from the agent wrappers 110, 130, the mediation agent MA then executes IP responsible for problem solving procedures. Following the message transmitted through such communication from the mediation agent MA, the agent wrappers 110, 130 then execute IP relating to the local processing, for example functional call of a target application.

(2. Action)

The present embodiment thus configured exerts the following actions.

(2-1. General Action)

Figure 14:
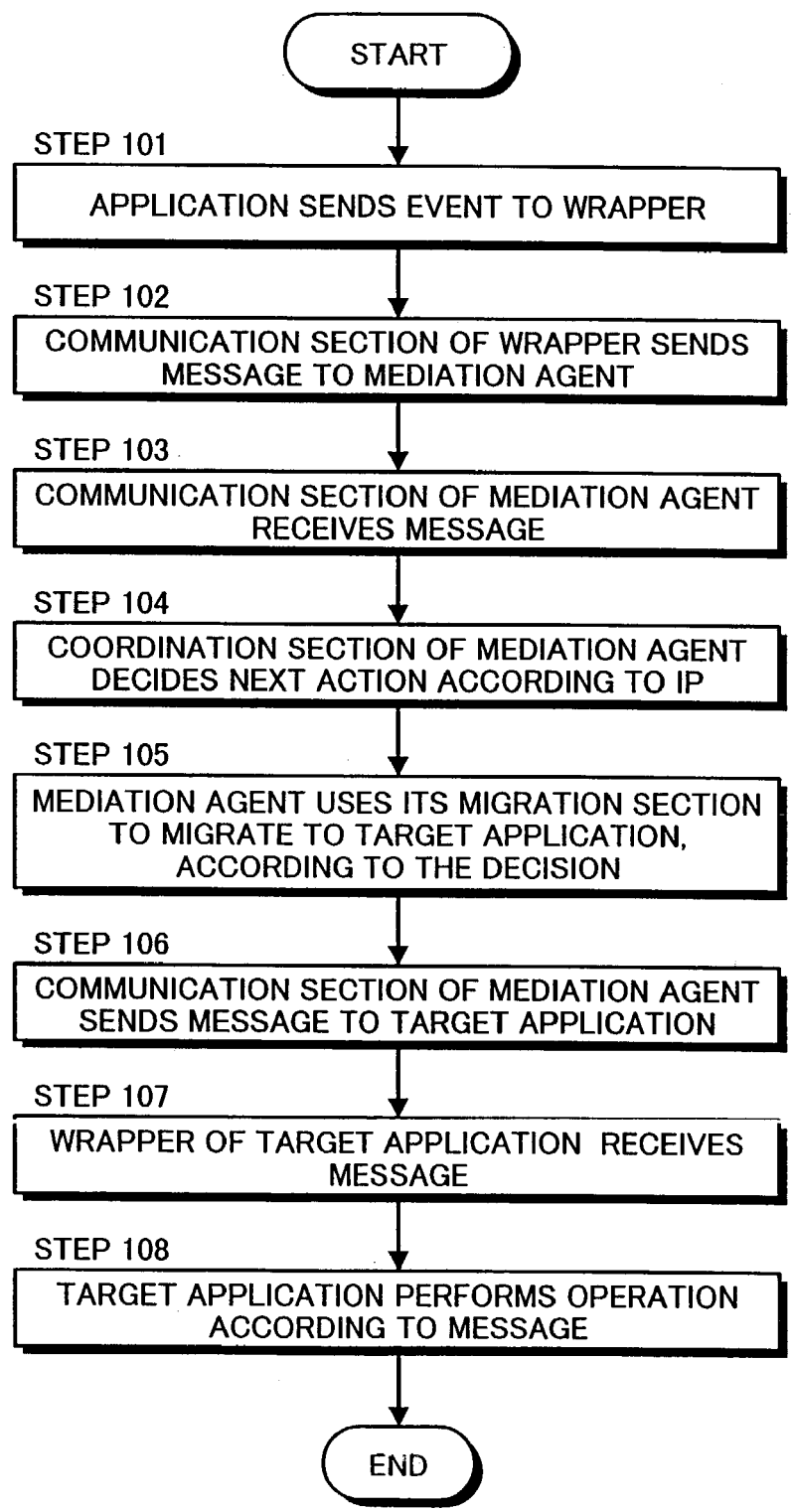
FIG. 14 is a flowchart that shows an example of a processing procedure in the second embodiment of the present invention.

FIG. 14 is a flow chart depicting the processing procedures between the mediation agent and individual constituent elements in the second embodiment; following the flow of processing procedures, the general action is described while showing how the mediation agent MA, the wrappers 110, 130 and applications 120, 140 as connection-targeted applications cooperatively operate functionally in a simple manner. The procedures comprise for example the following steps:

(1) a step of an event transmission from application 120 to the connected wrapper 110 by a native means (Step 101);

(2) a step of message forwarding from the wrapper 110 on receipt of the event through communication section 111 to the mediation agent (Step 102);

(3) a step of allowing the mediation agent to receive the message through the communication section 160 (Step 103) and determine the next action according to the corresponding IP by utilizing the coordination section 150 (Step 104), provided that the determined action is migration to wrapper 130;

(4) a step of allowing the mediation agent to migrate through the migration section 170 to the wrapper 130 (Step 105) and determine the next action according to the corresponding IP by utilizing the coordination section 150, provided that the action is message forwarding to the wrapper 130;

(5) a step of subsequent message forwarding from the mediation agent through the communication section 160 to the wrapper 130 (Step 106); and (6) a step of allowing the wrapper 130 to receive the message through the communication section 131 (Step 107) and make access to target application 140 by a native means on a needed basis, to make the application 140 to start the operation following the message (Step 108).

(2-2. Coordination Procedures)

For the execution of the procedures as described above, message management section 155 retaining messages on receipt and returning a message in conformity with a query from the state management section 151 can accurately maintain the context of a series of conversations between the constituent elements 10 of the individual local hosts H1, H2 and can thereby progress the processing.

Alternatively, the coordination section 150 processes the individual states of the system and the individual states proposed to IP in the style expressible in a state transition diagram, while IP management section 152 controls IP for the execution of the coordination among the individual constituent elements on the basis of such individual states and the state management section 151 controls the state of information processing according to the IP. In other words, storage section 153 stores IPs per unit assembly of a plurality of states, while the load section 154 calls an IP necessary for the current state from the storage section 153, according to the premises prey set individually on the plural states, and then transmits the IP to the state management section 151.

In this case, all potential states during the conversations in continuation between the mediation agent and the individual constituent elements are expressed in the state transition diagram. Then, the state management section 151 retains the record of the current state therein and call an essential action from the IP. Subsequently, the transition to the next state is executed under the transition conditions prey defined.

(3-1. General Description of the Effect)

As has been described above, in the second embodiment, complicated IPs describing the mutual actions among the constituent elements are never integrated into each of the individual constituent elements such as the legacy system and DB composing the distributed system, but are separated into IP for processing with regard to problem solving procedures among the constituent elements and IP for local processing with dependency on each constituent element. Through the unified control of the former by the mediation agent, the constituent elements are coordinated together, with the resultant establishment of the communication therein. Thus, a developer of the distributed system is never required to take account of the coordination function including message routing among individual constituent elements but can be concentrated on the designing of the internal functions of individual constituent elements.

Because the processing or style of for example local language in individual constituent elements is not any more necessarily considered for the coordination function among constituent elements, attention can now be focused just on the designing of more sophisticated mutual actions, whereby IP can more readily be designed. When individual constituent elements are to be modified or when problem solving procedures based on the mutual actions among the constituent elements are to be modified, system modification therefor can readily be attained because of the absence of any need to pay attention to the elements in the partners. Furthermore, a single mediation agent may be satisfactory but a plurality of mediation agents more efficiently can serve for the coordination.

In this embodiment, the number of communications is reduced because the mediation agent migrates to a communication node with a constituent element, so that the possible error incidence can be reduced in spite of any occurrence of an unstable communication line and additionally that the system resource can be released when the mediation agent is left from the node with no need.

By the presence of the storage section 153 and load section 154 arranged inside the coordination section 150 of the mediation agent, IP per se and the state control via IP can be separately designed, leading to ready installation thereof. This embodiment furthermore enables more efficient protocol management, because an identical IP can be allocated to specific states in such a manner that the IP class can be instanced.

Because IP is defined per assembly of a plurality of states, in this embodiment, IP configuration can readily be understood, while assemblies with possible transition to each other can be called up or the assemblies can otherwise be recycled in unit in a more simplified manner. In this embodiment, still additionally, premise conditions are preset on individual states included in each assembly, so that a state suitable for the current state of specific information processing can be picked up from IP.

In this embodiment, still yet furthermore, the individual states can be expressed in the state transition diagram; in other words, individual states are handled in the format of information expressible in the state transition diagram; accordingly, IP is more readily understandable, leading to more efficient development and debug operation.

In the present embodiment, additionally, the problem solving procedures effecting the coordination among constituent elements are separated from local processing intrinsic to individual constituent elements, whereby the problem solving procedures are applicable to any of the constituent elements, so that the resultant system is of a compact type, which can readily be designed and additionally modified.

In the embodiment, still additionally, the message management section 155 executes the control of message input and output and the control of message generation and interpretation, namely the control of retaining messages on receipt and returning a message in conformity with a query from the state management section 151. Accordingly, the context of a series of conversations between the mediation agent and the individual constituent elements can more accurately be maintained in a readier manner to enable the progress thereof. In the embodiment, the mediation agent executes communication through a message, using a combination of XML with an excellent profile for general purposes and ACL with a logic system at an intermediate language level, so that the invention is more readily applicable to a larger number of applications.

(3-2. Advantages of IP Unification Regarding Problem Solving Procedures)

Herein, the IP unification has the following advantages in addition to the readiness in designing. More specifically, the IP unified for problem solving procedures is different in the following respects from the conventional summed-up IPs each belonging to individual constituent elements.

(1) The unified IP is specific to problem solving procedures, separately from IP for the processing depending on each constituent element.

(2) In the IP, simplified expression is possible in such a manner that the same state and action to be executed in a plurality of constituent elements can be described as a loop.

(3) When the change of the alignment and order of individual constituent elements in a dynamic fashion induces a modification of processing procedures and the like, conventionally, the individual constituent elements should have IPs in satisfactory conformity with all the cases, leading to a very large numerical figure of the final sum of the IPs. However, in the present embodiment, areas with dependency on the alignment and order are concentrated not in individual constituent elements but in the IP for problem solving procedures. Hence, the expression then is more simplified, compared with the expression as the sum of the IPs. Accordingly, the number of the states in the IP unified from the standpoint of problem solving procedures is smaller than the number of the states in message-linked IPs allocated to conventional individual constituent elements.

When the IP is to be additionally modified during initial development or after the initiation of the operation, then, the space to be searched for states is reduced, leading to the improvement of construction readiness and maintenance profile.

(3-3. Characteristic Functional Properties)

One of the characteristic functional properties of the present embodiment is a coordination function by means of IP. More specifically, the coordination function among constituent elements is indispensable for recovering consistent operation from the distributed system, but the conventional environment to develop such a distributed system has never supported the coordination function sufficiently. On the contrary, the present embodiment provides IP unified regarding problem solving procedures of the coordination function, as well as an architecture for coordinating the individual constituent elements under the control of the IP via the mediation agent. In the following example, the improvement of the construction readiness and maintenance profile, as enabled by the IP unification, is exemplified through additional IP modification.

Figure 15:
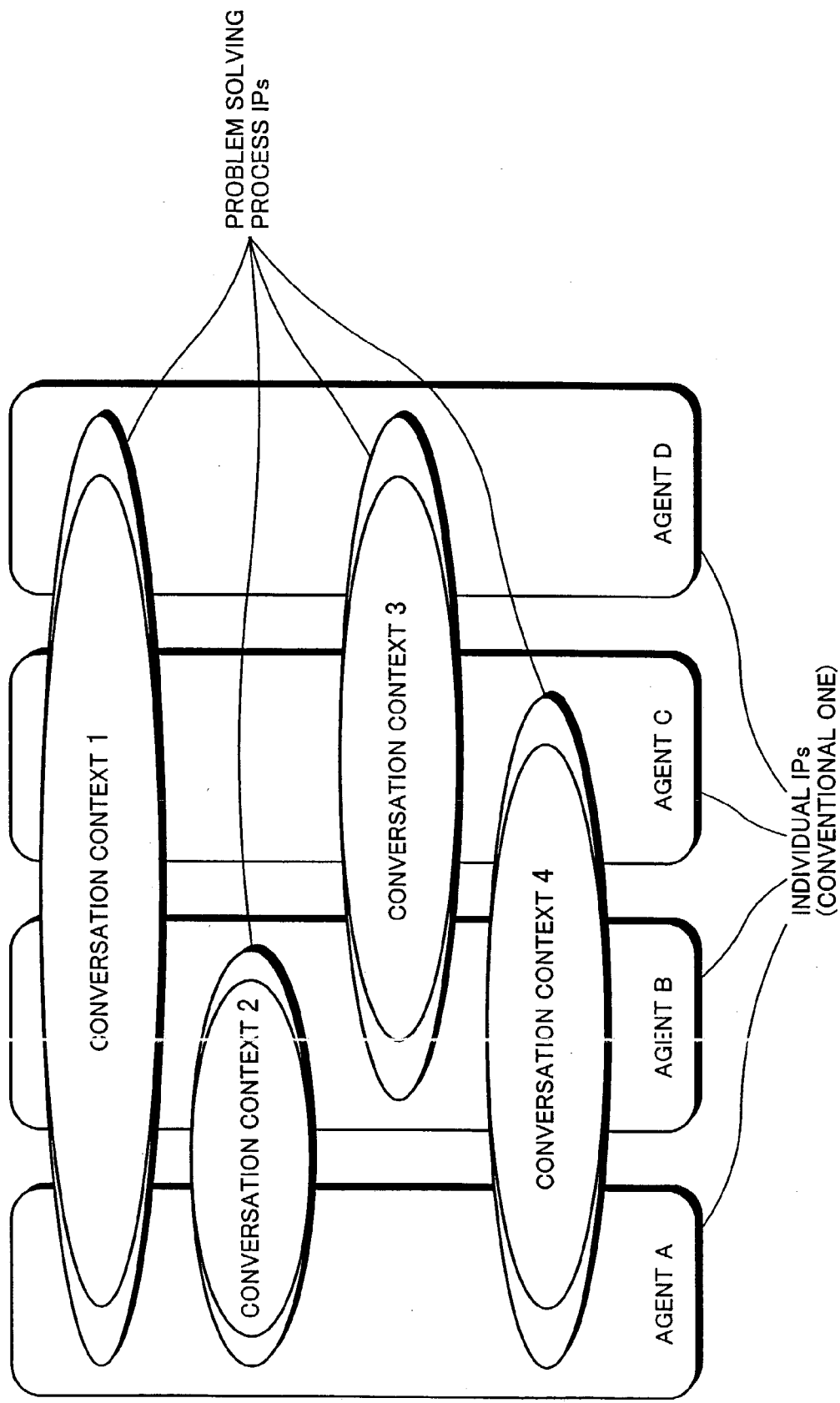
FIG. 15 is a conceptual view that shows a state of concentrating conversations among constituent elements included in a distributed system in the second embodiment of the present invention.

In other words, the IP unification regarding problem solving procedures corresponds to the concentration of conversations among individual constituent elements composing the distributed system (FIG. 15). The in-parallel processing profile is therefore partially lost, but the unified IP nevertheless does not fall under the scope of a concentrated-type system. One reason is that processing per se is executed in the individual constituent elements in a distributed manner, involving no concentration of communications to some node. The other reason lies in that problem solving procedures dedicated for different purposes are executed concurrently in parallel by a plurality of mediation agents after the problems are separately grouped, depending on the presence or absence of a difference in context.

Alternatively, the grouping of conversations per context has the following advantages. Essentially, conventional IP has included complicated processes integrated therein, such as one message routing function for each constituent element, namely a series of address determination processing including a step of forwarding (transferring) of a message on receipt to an appropriate agent following the flow of conversations and a step of returning a reply to the message to the sender of the original message, as well as a function for the control of complicated states, namely a function for appropriate management and control of a plurality of internal states emerging therein because of simultaneous execution of plural conversations.

In this embodiment, however, the mediation agent controls conversations per context unit and autonomously migrates while carrying a necessary data, so individual constituent elements are absolutely never required to carry any message routing function or state control function.

For the conventional IP, IPs essential for the modification of problem solving procedures due to a problem or a status, should be integrated in all of the constituent elements; otherwise, all the constituent elements should necessarily be modified on a needed basis. In the present embodiment, no modification of individual constituent elements but only switching of the mediation agent to another such agent is required on a needed basis. These advantages permit ready development of agent wrappers for individual constituent elements and accelerate the flexible utilization of existing systems as the object of the present embodiment.

According to the embodiment, then, the language ACL common to agents is adopted, whereby no knowledge is required for variable call methods with dependency on the other partner. When connection is targeted for other application types or other industry systems, it is very tough to design a communication function in the style of direct call of the method name of the connected partner because partner-relevant knowledge is likely to be poor; even if such communication function can be designed, the resulting communication function is poor in terms of extensibility. In this embodiment, on contrast, such individual differences can be absorbed in the agent wrappers owing to the adoption of the Speech-Act-based common language; additionally, operations including queries about lacking information can be executed. In the near future, the XML/ACL defined for message format may permit connection with other XML communication standards.

As to the migration function in the present embodiment, the communication cost can be reduced by using mobile agents (see Reference: White, J. E., "Mobile Agents", Software Agents, ed. Bradshaw, J. M., pp. 437–472, The MIT Press, Massachusetts, 1997). As regards to the communication frequency, the number of communications can be reduced prominently, because of the agent migration for local message exchange ports, compared with the message exchange through a network in repetition. This is very effective for a case with an unstable communication line, since the communication frequency should then be reduced although the communication data per communication is increased in that case.

In the embodiment, the possible incidence of error due to network trouble during a series of processing is less because the message exchange is executed locally, so an error processing mechanism can now be realized more readily. In the present embodiment, still furthermore, the mobile agent migrates after the termination of processing needed, so the agent wrappers can release the system resource for a term with no such processing under execution.

(3-4. Characteristic Profile from Application Aspects)

The present embodiment as described above is potentially applicable to various fields, and at least to the following cases:

(1) distribution-type electric power facilities out-of-operation plan assist system (see References: Takahiro Kawamura, Naoki Kase, Masaru Araki, and Akihiko O-suga, "Development of distribution-cooperation type scheduling system based on coordinating negotiation among schedulers", Shin-gaku Report (D-1), Vol. J81-D-I, No. 5, pp. 505–513, May 1998; Takahiro Kawamura, Naoki Kase, Masaru Araki, Akihiko O-suga and Shin-ichi Hoita, "Approach to distribution constraint satisfaction problem using mobile agent", Shin-gaku Technical Report, Vol. 98, No. 58, pp. 15–22, 1998); and (2) recycle information system via network agents Based on these developed examples, it can be said that the system of the present embodiment is appropriately satisfactory at least for the development of a distribution system in the following cases:

(1) for partial modification of the processing flow of a distribution system after the start of the system operation;

(2) for construction of a distribution system with modification of existing systems as little as possible;

(3) for achieving connection, targeting for other application types and other industry systems; and (4) for utilization of the system by means of mobile terminal. Due to the top-down-like approach of the present invention, currently, IP is designed for the positions and functions of individual constituent elements having been identified; by constructing the invention in such a configuration that the mediation agent utilizes another directory service in preparation, the resulting invention can be utilized more flexibly. In the present embodiment, conversations are grouped per context unit, but connection among individual contexts, namely connection among mediation agents, is not currently supported. For the purpose of the control of a plurality of transactions in a distributed system composed of a constituent element database, a mediation agent responsible for each transaction should be excluded under controls by some means. Such means should necessarily be prepared per one application. For the out-of-operation plan assist system, for example, a lock mechanism per resource unit targeted for scheduling may satisfactorily be arranged.

4. EXAMPLES

Examples of system installation and IP development are now presented hereinbelow, followed by the description of a specific IP for the application thereof to a distributive solution of the problem N-queens.

(4-1. Summary of System Installation)

Figure 16:
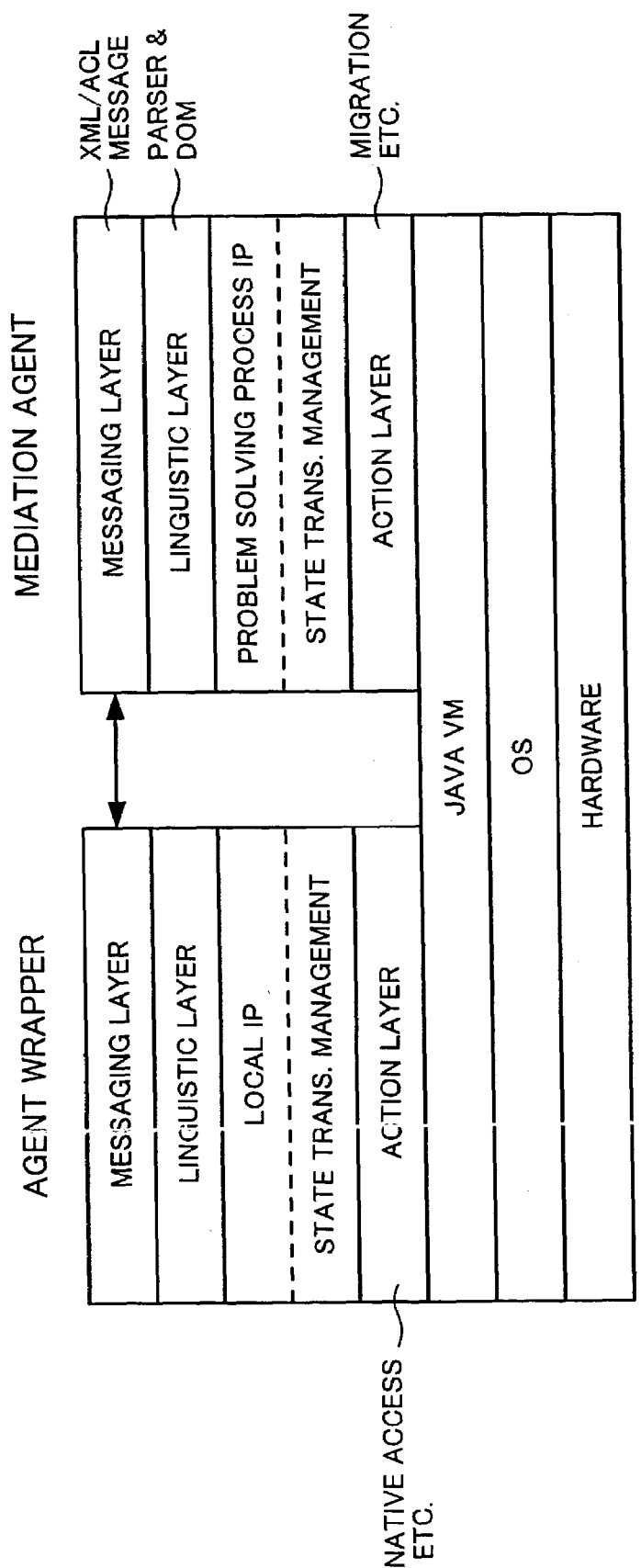
FIG. 16 is a conceptual view that shows a structure of architecture levels in an example of the present invention.

The system of the present example is installed, by using the language Java. The level structure of the architecture in the example is depicted in FIG. 16.

Additionally, the mediation agent and the agent wrappers are individually installed as Java classes. In the present example, a distribution system is developed by appropriately instancing a necessary class and using the prepared method while extending the prepared method if necessary. Still additionally, the agent wrappers are connected to target applications through the support of Native Method and the use of the DBC function.

Herein, the class composition and method list may be prepared satisfactorily in any structure. Accordingly, the detailed description thereof is not included herein. The number of all the classes is 50; among them, the number of the classes required to be extended for the development of a distribution system is 4 in a practical sense. For the development, visual interface is partially supported.

With regard to the coordination function, IP per se is installed as one class and stored in a repository called IP library. This is preliminarily provided by a system developer, which is then instanced and used on the execution of such coordination by the mediation agent.

The IP class preliminarily includes methods calling for fundamental actions, message preparation based on XML/ACL, message-receiving and message-forwarding with agent wrappers and the migration of mediation agents. Additionally, the IP library contains a number of IP classes as samples. The mechanism inducing state transition is practically enabled as a mechanism sequentially calling for one by one of the preliminarily defined states satisfying the conditions.

The migration function and communication function are based on the Java distribution object technique. Using for example a package HORB (see Reference: Hirano, S., "HORB: Distributed Execution of Java Programs", Proceedings of International Conference on Worldwide Computing and its Applications 97, Japan, P. A-1-2, 1997), the migration of the mediation agent and the message exchange between the mediation agent and the agent wrappers are realized.

(4-2. Solution of Thesis N-Queens with Distribution System)

Figure 17:
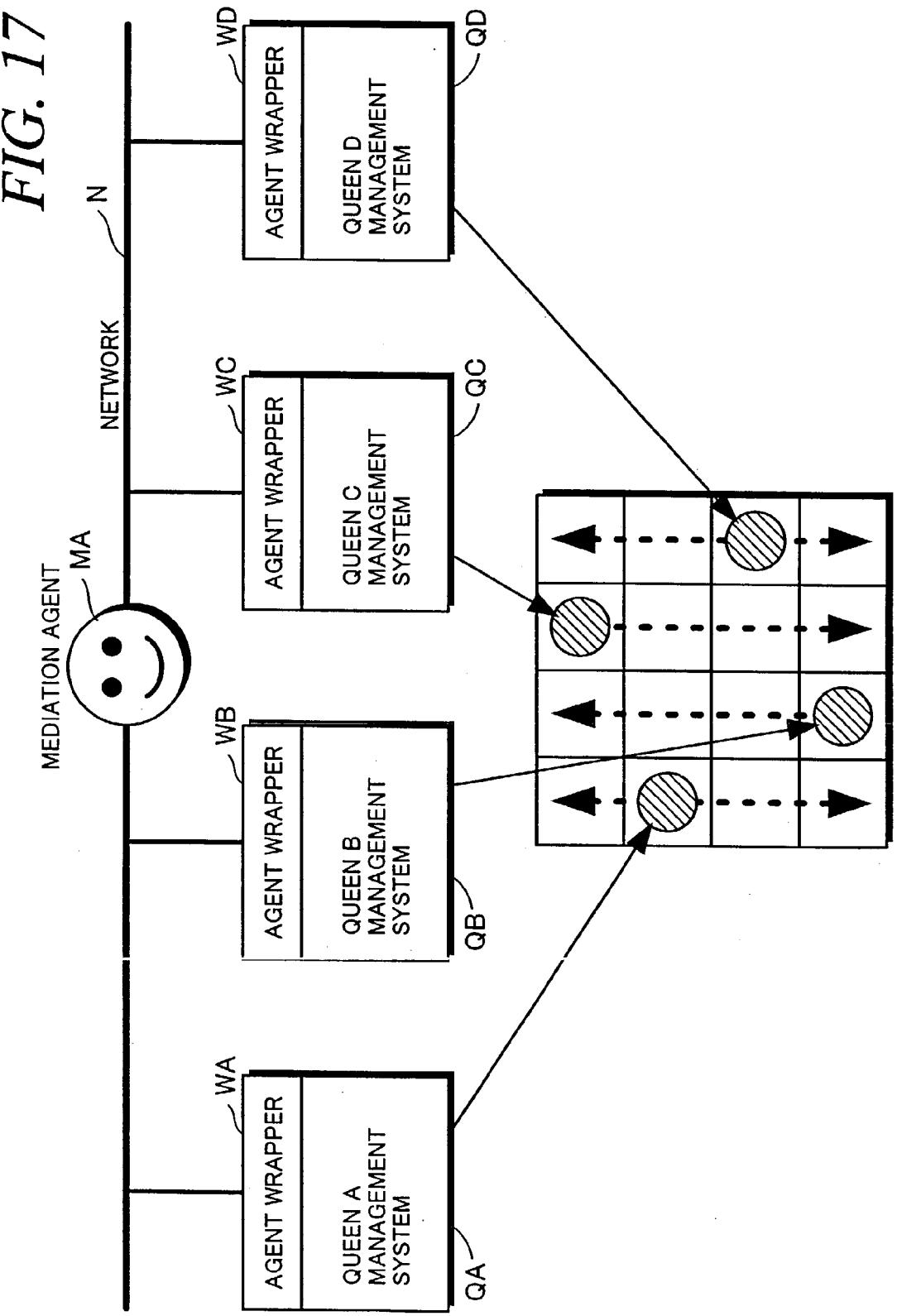
FIG. 17 is a conceptual view that shows an example of the present invention.

Using herein the well known thesis N-Queens as a subject, it is now discussed what~advantages the aforementioned unification of IP for problem solving procedures has. In the first place, FIG. 17 shows the summary of a distributed system for solving the thesis N-Queens, provided that the distributed system has been developed using the present example. The thesis is as follows; the distributed system is composed of individual control systems QA through QD controlling the positions of individual Queens on a square of 4 boxes×4 boxes. Then, these control systems are connected through agent wrappers WA through WD to Network N, while mediation agent MA releases the positional constraint over the Queens.

So as to examine the advantages of the IP unification, then, the IP for problem solving procedures for use in the example is compared with the IPs belonging to the individual constituent elements of a conventional distributed system. On the assumption that an additional modification of the IP is possibly executed after system development, the method for releasing the constraint over the Queens is partially modified experimentally therefor. So as to verify the improvement of construction readiness and maintenance profile as described in the section "Advantages of IP unification regarding problem solving procedures", the number of states required to be searched during the modification of the IP is compared with the actual number of the modified portions and the distribution degree thereof.

Citing an example wherein during constraint release procedures on a backtrack algorithm and just when the procedures are eventually stacked, a process comprising allowing an immediately prior agent to consider an alternative proposition is modified to a process comprising allowing the most upstream agent to consider an alternative proposition, the difference is now described below between the IP unified with regard to problem solving procedures and the conventional IP.

Figure 18:
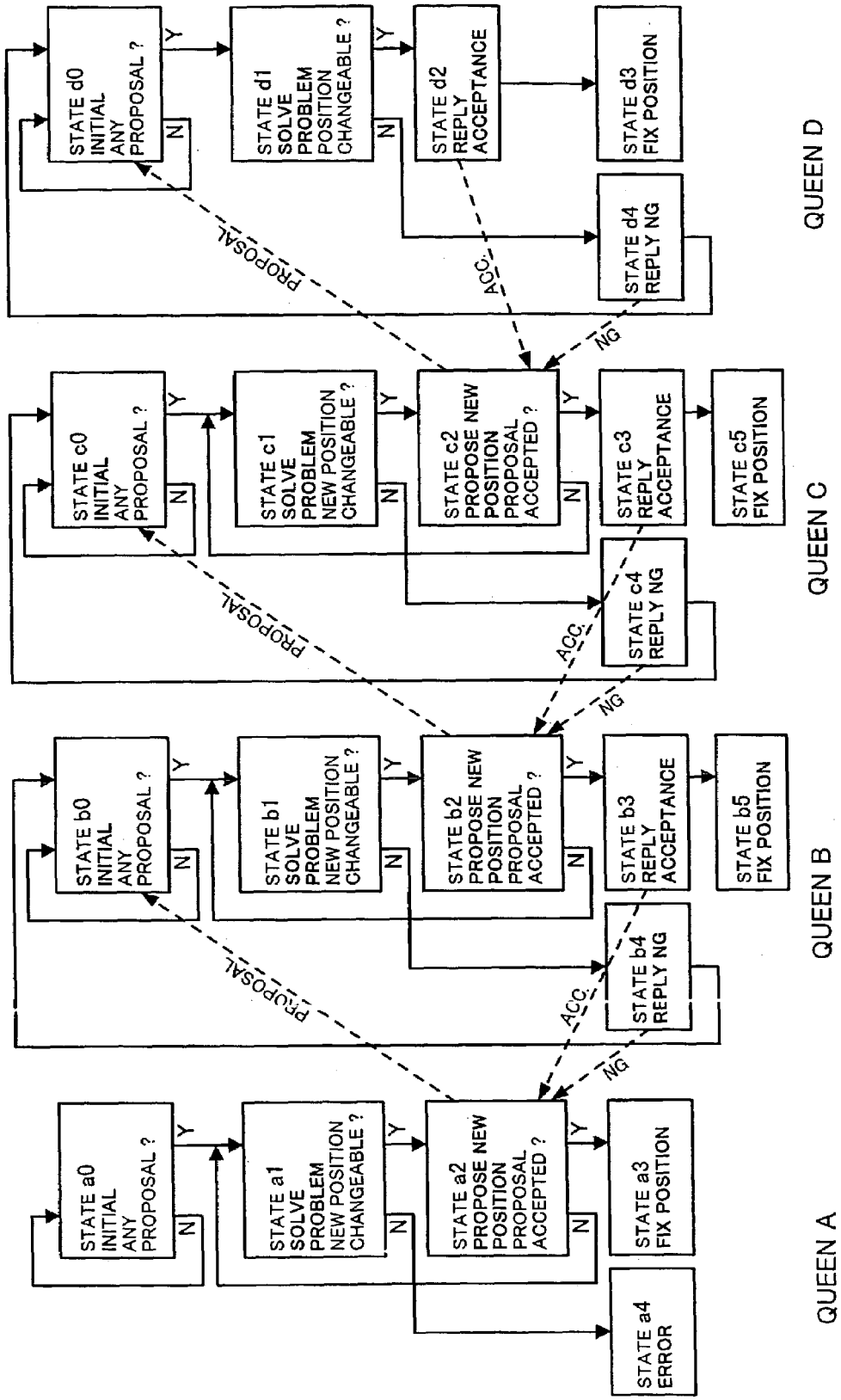
FIG. 18 is a conceptual view that shows IPs added to each other, which are distributed to every constituent element in the prior art (before change of algorithm).
Figure 19:
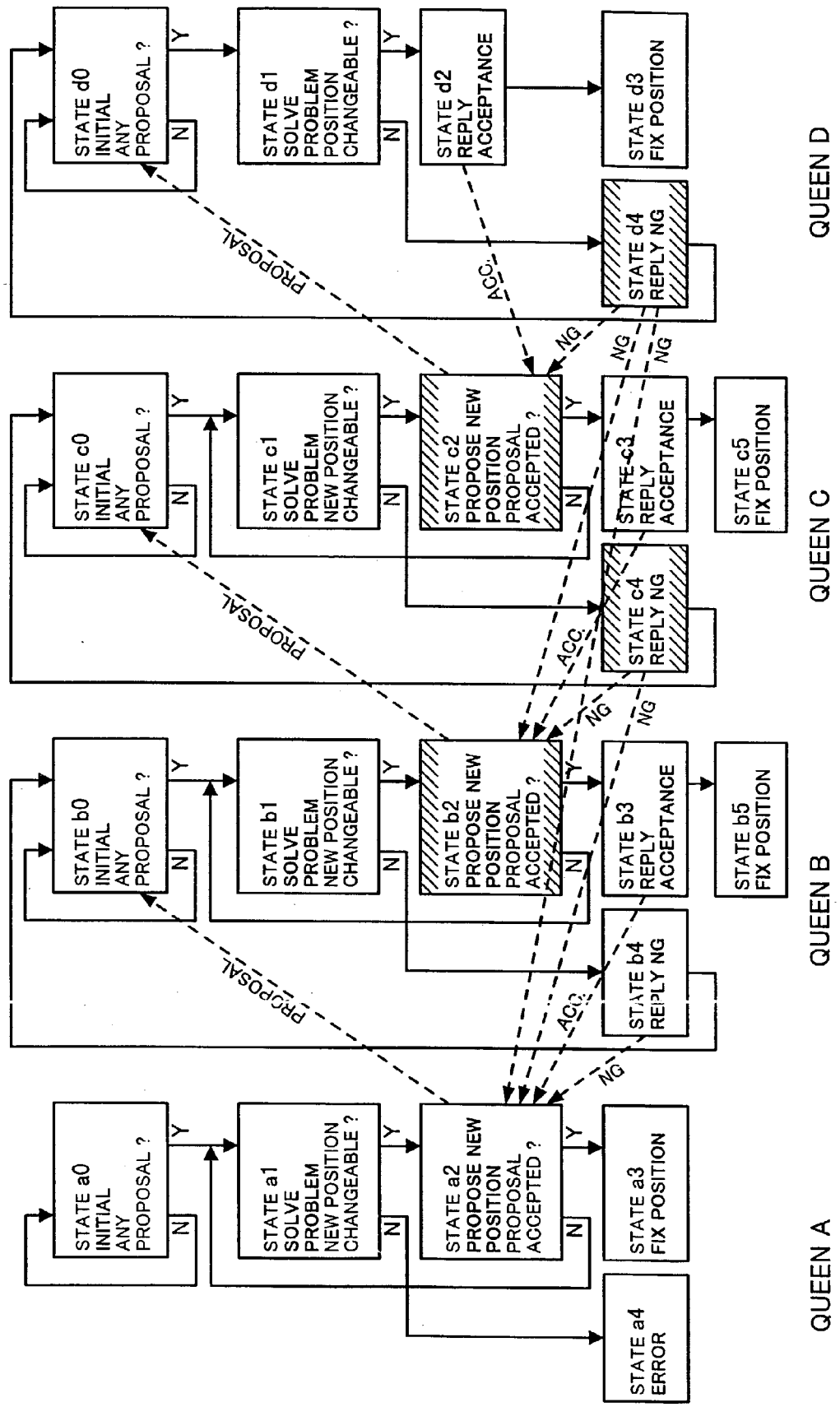
FIG. 19 is a conceptual view that shows IPs added to each other, which are distributed to every constituent element in the prior art (after change of algorithm).

FIG. 18 depicts the IP expressing backtrack algorithm prior to such modification, provided that each of the constituent elements of a conventional distributed system has IP. Alternatively, FIG. 19 depicts the IP expressing backtrack algorithm after such modification, provided that each of the constituent elements of the conventional distributed system has IP.

Figure 20:
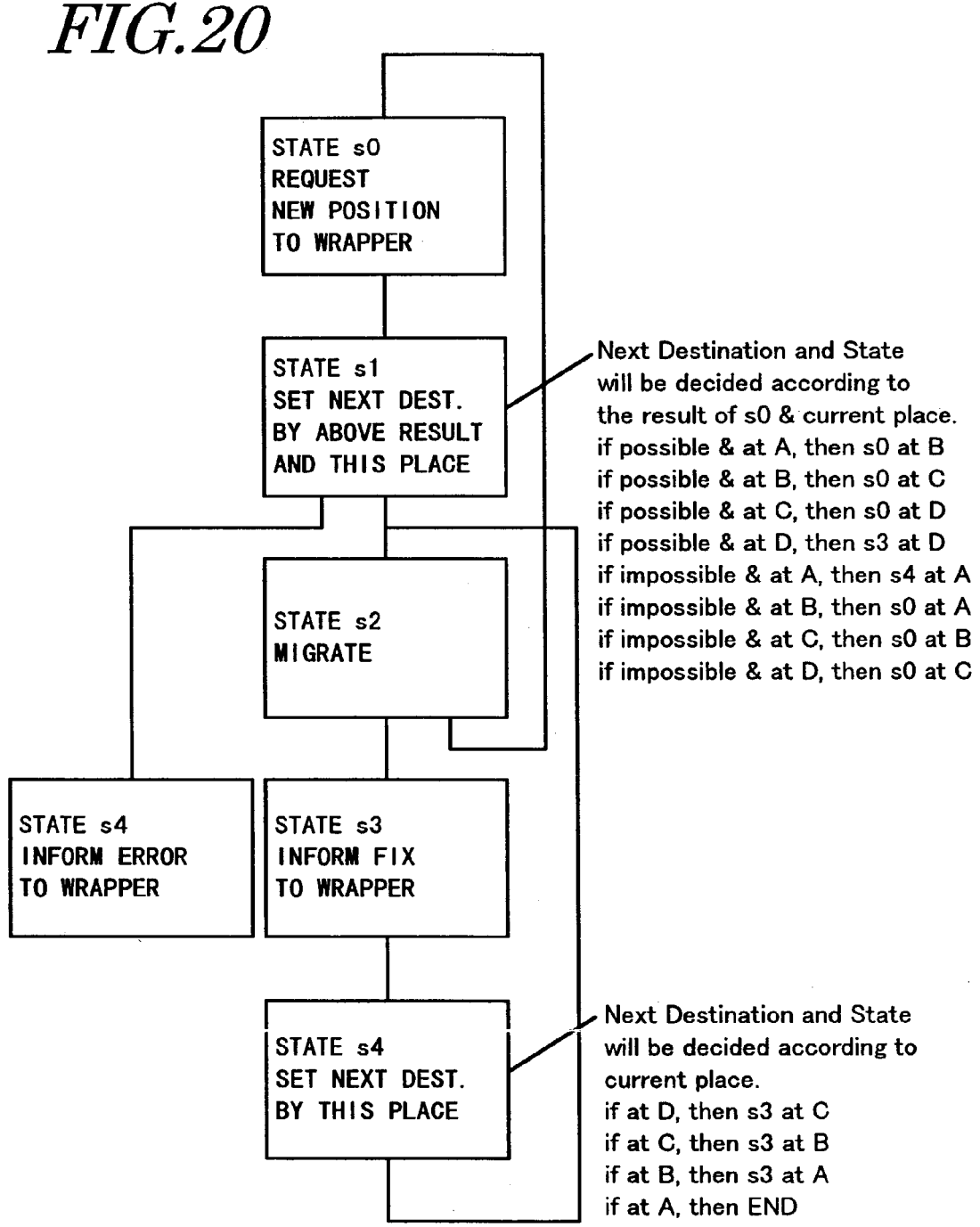
FIG. 20 is a conceptual view that shows IPs unified with regard to problem solving procedure in an example of the present invention (before change of algorithm).
Figure 21:
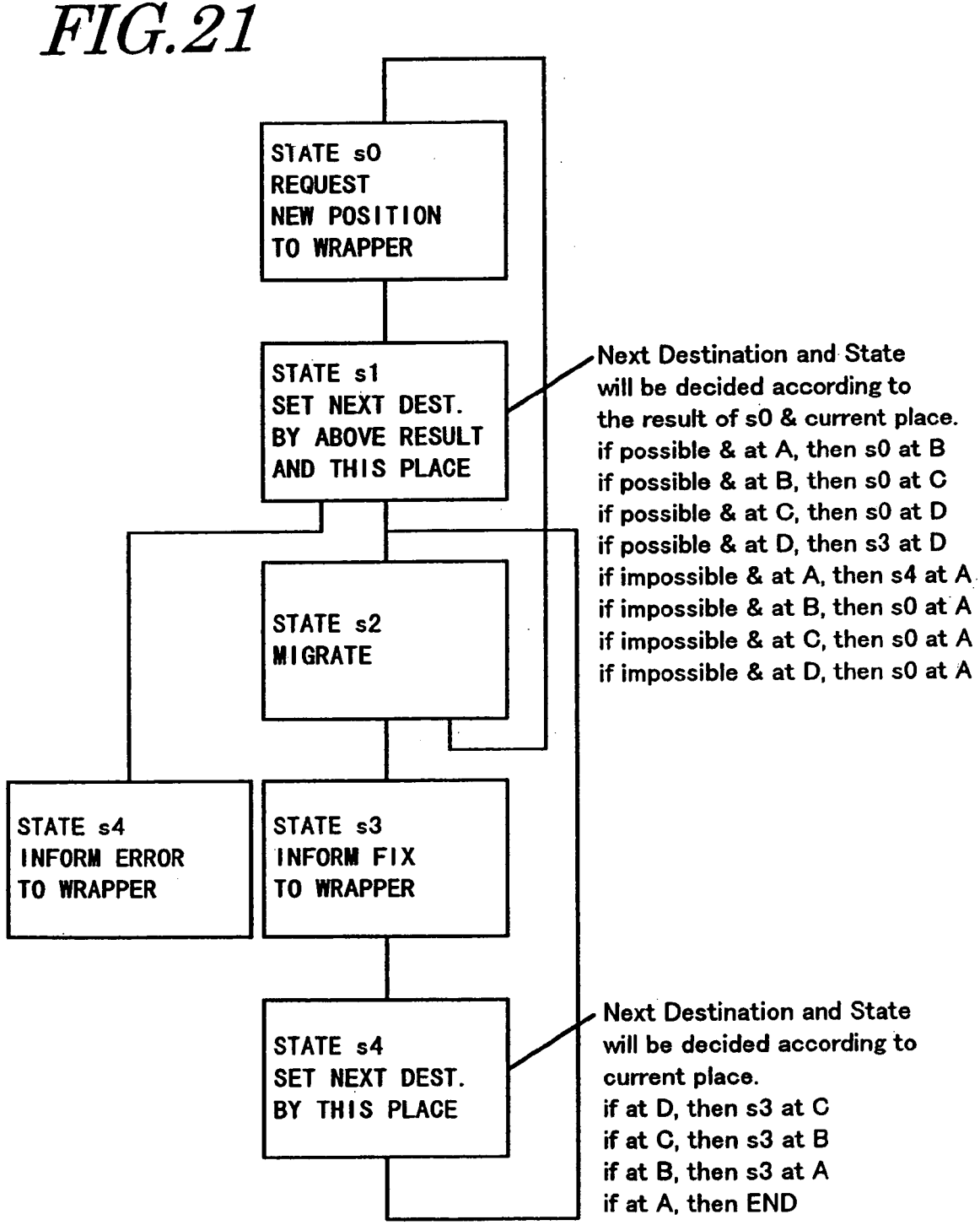
FIG. 21 is a conceptual view that shows IPs unified with regard to problem solving procedure in an example of the present invention (after change of algorithm).
Figure 22:
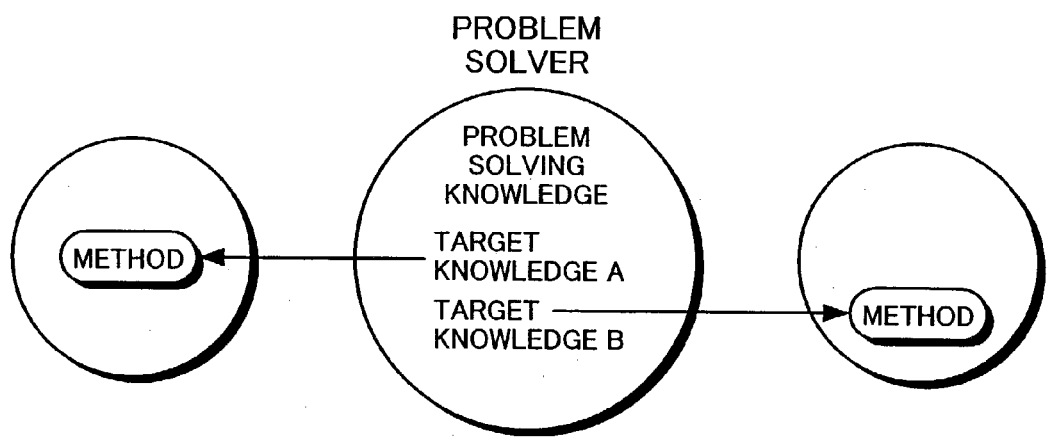
FIG. 22 is a conceptual view that shows an example that a single problem solver performs intensively processing as an example of the prior art.
Figure 23:
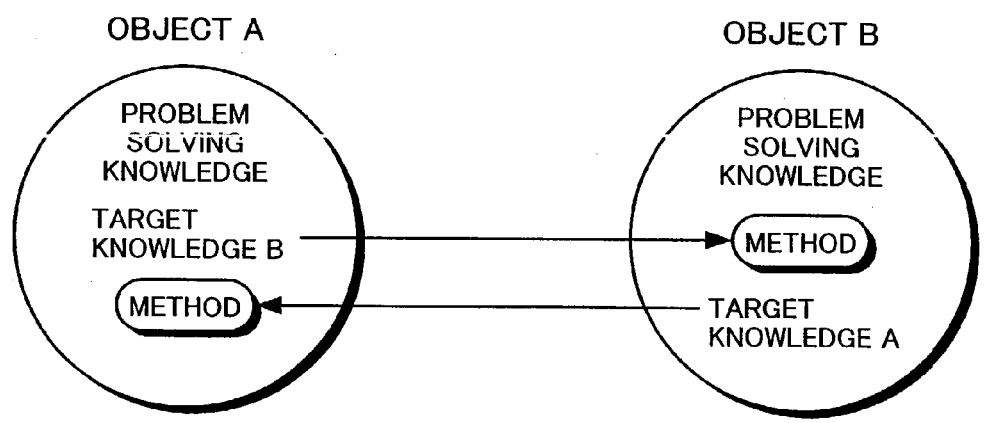
FIG. 23 is a conceptual view that shows an example that objects exchange directly each other.
Figure 24:
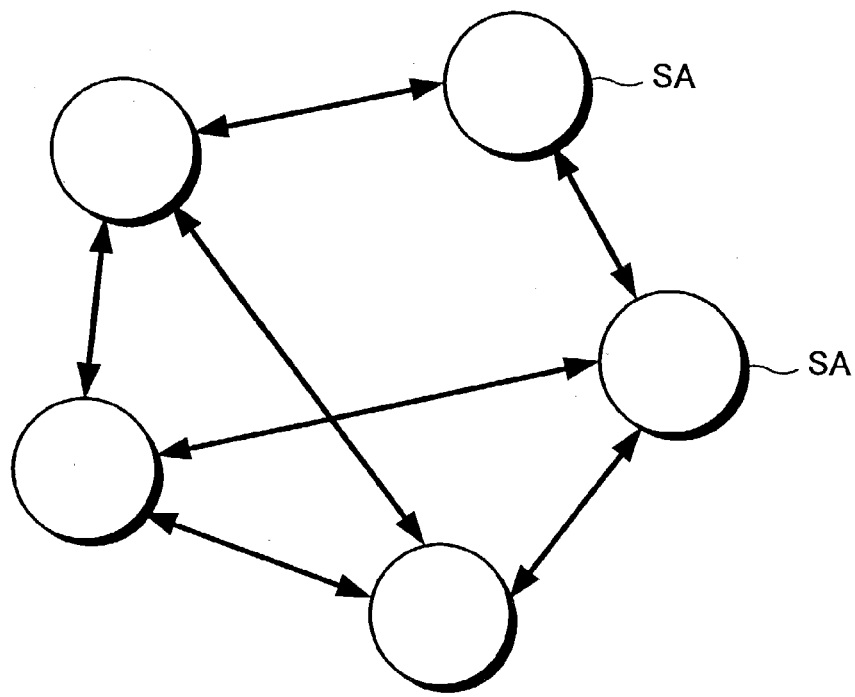
FIG. 24 is a conceptual view that shows, as an example of the prior art, a direct negotiation model.
Figure 25:
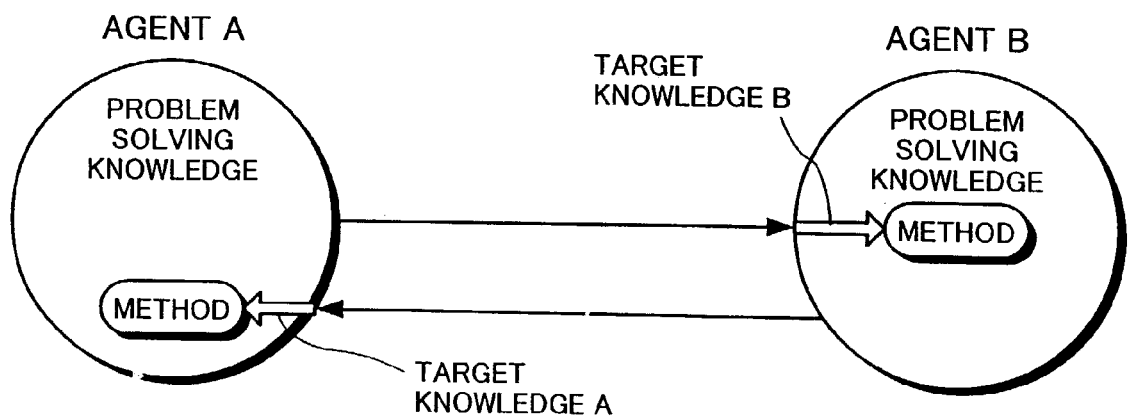
FIG. 25 is a conceptual view that shows, as an example of the prior art, an example that an agent negotiates directly.
Figure 26:
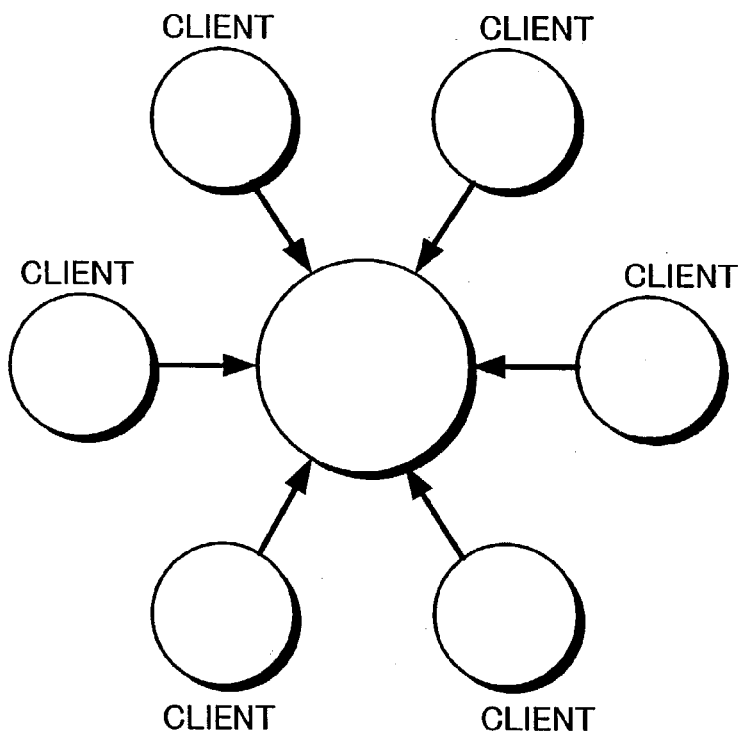
FIG. 26 is a conceptual view that shows a client server model being an architecture of the prior distributed system.
Figure 27:
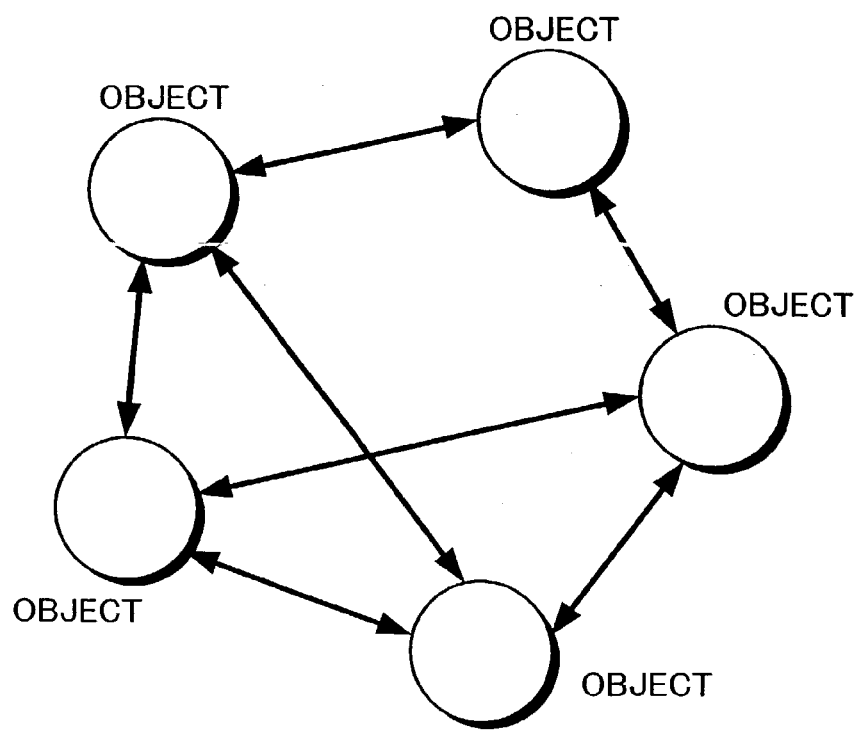
FIG. 27 is a distributed object model being an architecture of the prior distributed system.

Additionally, FIG. 20 depicts the IP expressing backtrack algorithm prior to such modification, provided that the IPs concerning problem solving procedures are unified; and FIG. 21 depicts the IP expressing backtrack algorithm after such modification, provided that the IPs concerning problem solving procedures reunified. In FIGS. 20 and 21, the individual agent wrappers include initialization processing and definite processing, both depending on targeted constituent elements, and the migratory processing of Queens. In response to an instruction from the mediation agent, each processing is executed.

The comparison between FIGS. 18 and 20 establishes the confirmation of the difference between the IP unified with regard to problem solving procedures as described in the section "Advantages of IP unification regarding problem solving procedures" and the summed-up IPs assigned to the conventional individual constituent elements. In FIG. 18, processing for problem solving procedures and processing depending on each constituent element (initialization processing and definite processing) are in mixture, so a series of interactive flows among the constituent elements is hardly followed up. The problem solving procedures at the constituent element B are identical to those at the constituent element C, but the IPs for the two procedures are not completely identical because of local processing contained in these elements. Accordingly, their IPs are expressed in parallel with the resultant complicated description.

On the contrary, the unified IP is separated from processing with dependency on constituent elements, so the same problem solving procedures are expressed with loops in the unified IP Accordingly, the flow of the processing is readily followed up.

Furthermore, FIG. 18 depicts the backtrack algorithm for sequentially executing constraint release processing of A, B, C and D in this order; for executing constraint release processing of D, C, B and A in this order inverse to the aforementioned order, each constituent element should have two types of IPs, depending on the sequential order of the element per se. Furthermore, these IPs may be exchanged to each other if necessary. Alternatively because processing procedures with dependency on the sequential order are concentrated in the unified IP (FIG. 20), each constituent element is not required to have any IP.

On comparison of FIG. 18 with FIG. 19 and on comparison of FIG. 20 with FIG. 21, it is verified that the construction readiness and maintenance profile during the partial modification of IP can be improved as described in the section "Advantages of IP unification regarding problem solving procedures". More specifically, the modification of the states shown in FIG. 18 to those in FIG. 19 requires checking the states of 22 in number on the premise that all the states of the current IP should be checked for IP modification. On contrast, the modification of those in FIG. 20 to those in FIG. 21 requires checking the states of 6 in number.

Additionally, the actual number of modified states (with hatching) is 4 after the modification of FIG. 18 to FIG. 19, while the actual number of modified states (with hatching) is just 1 after the modification of FIG. 20 to FIG. 21. In the former case, the modification covers 3 constituent elements among the 4 constituent elements, while the mediation agent with the unified IP is singly modified in the latter case.

(5. Other Embodiments)

The invention is not limited to the second embodiment but encompasses other embodiments illustrated below. An embodiment is described, wherein at least one constituent element is equipped with a second coordination means for the execution of the coordination among some of constituent elements. In such a manner, the coordination among some the constituent elements can independently be executed, separately from the coordination of the entirety, with the resultant achievement of more precise coordination, thus leading to more efficient information processing. The coordination among constituent elements may satisfactorily be executed by using algorithms other than IP.

The details of the application type for each constituent element, the message communication style between each constituent element and a mediation agent, the IP type and the storage form thereof may freely be determined.

3. Effects of the Invention

As has been described above, in accordance with the invention, the utilization of existing applications and the additional modification of cooperative protocols can be facilitated more readily, by allowing the agent to have a function for the coordination among the applications. A distributed system can more efficiently be constructed because a plurality of existing systems such as legacy system and package software can be bonded together in a more flexible manner by using the mediation agent.

What is claimed is:

1. A processing unit among a plurality of processing units that form a distributed system, comprising:
   storage means for storing target knowledge with regard to a given target and problem solving knowledge representing how problem solving with regard to said target is to be performed;
   communication means for communicating with a mediation agent to transmit information of the processing unit and receive information from the mediation agent; and
   processing means for performing a part of said problem solving by making use of said target knowledge and said problem solving knowledge fundamentally and making use of said information from said mediation agent optionally,
   wherein said mediation agent is generated when the processing unit is required to cooperate with another processing unit, wherein the mediation agent migrates among said processing units and has cooperation problem solving knowledge that represents how said processing units cooperate with each other to perform said problem solving, and wherein the mediation agent mediates cooperation among said units by making use of said cooperation problem solving knowledge to cause said each unit to perform said problem solving.

2. The processing unit according to claim 1, wherein the processing unit is a scheduler that has a plurality of variables and performs a constraint satisfaction problem solving by assigning for each variable a value that is not contrary to a constraint among the variables.

3. The processing unit according to claim 1, wherein said communication means communicates with said mediation agent in a predetermined format.

4. The processing unit according to claim 3, wherein said medication agent comprises:
   communication means for communicating with said each processing unit in said format; and
   coordination means for performing coordination among said processing units.

5. The processing unit according to claim 3, wherein said each processing unit exists on a plurality of nodes, respectively, and wherein said mediation agent has the mobility to migrate among said nodes.

6. The processing unit according to claim 4, wherein the processing unit comprises coordination means for performing coordination of the processing unit.

7. The processing unit according to claim 4, wherein said coordination means of said mediation agent comprises:
   protocol management means for managing an interaction protocol that performs coordination among said processing unit; and
   status management means for performing said coordination by managing status of information processing based on said interaction protocol.

8. The processing unit according to claim 1, wherein said mediation agent comprises means for diminishing the mediation agent when the mediation agent completes cooperation among said processing units.

9. A mobile agent which migrates among a plurality of processing units that form a distributed system, comprising;
   storage means for storing cooperation problem solving knowledge that represents how said plurality of processing units cooperate with each other to perform said problem solving;
   communication means for communicating with said plurality of processing units to receive information from each processing unit and transmit information generated from either or both of said cooperation problem solving knowledge and the received information to each processing unit; and
   processing means for generating the information to be transmitted to each processing unit by making use of said cooperation problem solving knowledge when said plurality of processing units are required to cooperate with each other, and for mediating cooperation among said processing units by causing said communication means to transmit the generated information to each processing unit, whereby causing each processing unit to perform said problem solving,
   wherein said each processing unit comprises communication means for communicating with said mobile agent in a predetermined format; and
   wherein the mobile agent comprises means for diminishing the mobile agent when the mobile agent completes cooperation among said processing units.

10. The mobile agent according to claim 9, wherein said each processing unit is a scheduler that has a plurality of variables and performs a constraint satisfaction problem solving by assigning for each variable a value that is not contrary to a constraint among the variables, wherein said mobile agent comprises generation means for generating an agent in correspondence to each alternative when there exists a plurality of alternatives with regard to the assignment of values for the variables, and wherein said each agent corresponding to each alternative executes said cooperation protocol among said schedulers independently of the other agents and according to the alternative.

11. The mobile agent according to claim 9, wherein said each processing unit is a scheduler that has a plurality of variables and performs a constraint satisfaction problem solving by assigning for each variable a value that is not contrary to a constraint among the variables, wherein said mobile agent comprises generation means for generating an agent in correspondence to each strategy if there exists a plurality of strategies of what criterion is used for selection of a value to be assigned, and wherein said each agent corresponding to each strategy performs search of said solution by assigning values for the valuables independently of the other agents, at the same time, and according to the strategy.

12. The mobile agent according to claim 9, wherein said each processing unit is a scheduler that has a plurality of variables and performs a constraint satisfaction problem solving by assigning for each variable a value that is not contrary to a constraint among the variables, wherein said mobile agent comprises generation means for generating an agent in correspondence to each variable when there are a plurality of schedulers that have variables being approximately equal in priority with regard to the order in which values are decided, wherein said each agent corresponding to each variable performs search of said solution by assigning values for the valuables independently of the other agents and at the same time, and wherein said mobile agent comprises means for merging each agent by changing each variable so as to minimize the change of each variable according to said constraint among the variables.

13. The mobile agent according to claim 9, wherein the mobile agent comprises:

communication means for communicating with said each processing unit in said format; and coordination means for performing coordination among said processing units.

14. The mobile agent according to claim 9, wherein said each processing unit exists on a plurality of nodes, respectively, and wherein the mobile agent has the mobility to migrate among said nodes.

15. The mobile agent according to claim 13, wherein at least one of said processing units comprises coordination means for performing coordination of the processing unit.

16. The mobile agent according to claim 13, wherein said coordination means of the mobile agent comprises:

protocol management means for managing an interaction protocol that performs coordination among said processing units; and status management means for performing said coordination by managing status of information processing based on said interaction protocol.

* * * * *